US012720131B2

(12) United States Patent
Hinds et al.

(10) Patent No.: US 12,720,131 B2
(45) Date of Patent: Aug. 25, 2026

(54) FACILITATING MANAGEMENT OF IMS METADATA FOR SCENE MEDIA

(71) Applicant: TENCENT AMERICA LLC, Palo Alto, CA (US)

(72) Inventors: Arianne Hinds, Los Gatos, CA (US); Stephan Wenger, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 216 days.

(21) Appl. No.: 18/767,523

(22) Filed: Jul. 9, 2024

(65) Prior Publication Data

US 2025/0024089 A1 Jan. 16, 2025

Related U.S. Application Data

(60) Provisional application No. 63/528,300, filed on Jul. 21, 2023, provisional application No. 63/526,143, filed on Jul. 11, 2023, provisional application No. 63/526,136, filed on Jul. 11, 2023, provisional application No. 63/525,959, filed on Jul. 10, 2023, provisional application No. 63/525,958, filed on Jul. 10, 2023.

(51) Int. Cl.
*H04N 21/238* (2011.01)
*H04N 21/81* (2011.01)

(52) U.S. Cl.
CPC ....... *H04N 21/238* (2013.01); *H04N 21/8146* (2013.01)

(58) Field of Classification Search
CPC ......................... H04N 21/238; H04N 21/8146
See application file for complete search history.

(56) References Cited

U.S. PATENT DOCUMENTS

2004/0263512 A1 12/2004 Santodomingo et al.
2012/0321273 A1* 12/2012 Messmer ............. H04N 9/8205 386/E5.028

(Continued)

FOREIGN PATENT DOCUMENTS

WO 2023/083920 A1 5/2023

OTHER PUBLICATIONS

Written Opinion of the International Searching Authority dated Jan. 16, 2025 in Application No. PCT/US2024/037312.

(Continued)

*Primary Examiner* — Kyu Chae
(74) *Attorney, Agent, or Firm* — Sughrue Mion, PLLC

(57) ABSTRACT

Embodiments of the present disclosure are directed to a method, device, system, and a non-transitory computer readable medium to determine, whether a set of metadata used to annotate a particular media or media portion in the immersive media stream is coherent with the media or media portion that the set of metadata describes. The method may also include in response to determining a change has been made to the immersive media in the immersive media bitstream, generating an indicator specifying that the set of metadata and the immersive media in the immersive media bitstream are no longer aligned. The method may also include annotating the particular media or media portion using the set of metadata to facilitate subsequent access and interpretation of the set of metadata by a second processor that is different from the first processor.

20 Claims, 22 Drawing Sheets

(56) References Cited

U.S. PATENT DOCUMENTS

| | | | | |
|---|---|---|---|---|
| 2019/0104326 | A1* | 4/2019 | Stockhammer | ......... H04L 65/65 |
| 2021/0243418 | A1 | 8/2021 | Ojala | |

OTHER PUBLICATIONS

Notification of Transmittal of the International Search Report and the Written Opinion of the International Searching Authority or the Declaration dated Jan. 16, 2025 in Application No. PCT/US2024/037312.

International Search Report dated Jan. 16, 2025 in Application No. PCT/US2024/037312.

* cited by examiner

```
{"accessors": [
{"bufferView": 0, "componentType": 5123, "count":
12210, "max": [ 3211 ], "min": [ 0 ],
"type": "SCALAR"}
"asset": { "generator": "Created by Author Name",
"version": "2.0"
},
"bufferViews": [ { "buffer": 0, "byteLength": 24420,
"byteOffset": 0,"target": 34963}],
"buffers": [
{ "byteLength": 254640, "uri": "Sample.data.bin"}],
"images": [{ "uri": "material0_basecolor.jpeg" }],
"materials": [{
"doubleSided": true, "emissiveFactor": [ 1, 1,1 ]}]],
"meshes": [
{"primitives": [{"attributes": { "NORMAL": 3,
"POSITION": 1, "TANGENT": 4, "TEXCOORD_0": 2},
"indices": 0, "material": 0,"mode": 4}]}],
"nodes": [{ "mesh": 0},{ "mesh": 1}
],
"scene": 0,
"scenes": [
{"nodes": [ 0, 1 ]}
],
"textures": [{
"sampler": 0, "source": 0}]}
```

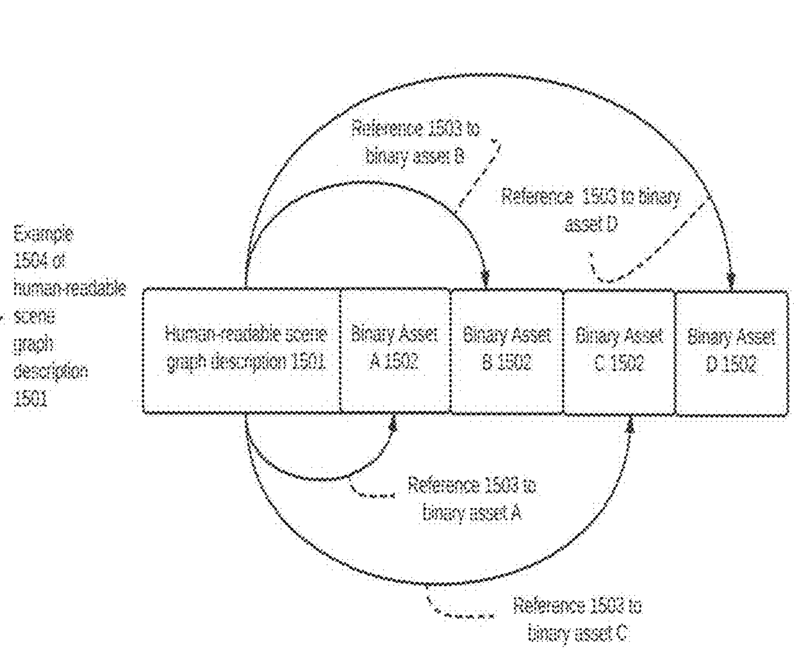

FIG. 15

["IMS Version":"1.0",
"IMS Largest Annotation Sequence ID used":"8192"]

FIG. 22A

["IMS Version":"1.0",
"IMS Largest Annotation Sequence ID used":"8192"
"IMS SEQ ID1": {"SYSTEM ID":"IMS SYSTEM ID","OFFSET":"FILE_OFFSET"},
"IMS SEQ ID2": {"SYSTEM ID":"IMS SYSTEM ID","OFFSET":"FILE_OFFSET},
"IMS SEQ ID3": {"SYSTEM ID":"IMS SYSTEM ID","OFFSET":"FILE_OFFSET}
"IMS SEQ ID4": {"SYSTEM ID":"IMS SYSTEM ID","OFFSET":"FILE_OFFSET}]

FIG. 22B

["IMS Version":"1.0",
"IMS_SYSTEMS_USED":{"Value nodes","Lighting nodes","Geometry nodes","Render instruction nodes"},
IMS_SEQUENCE_ID_FILE_OFFSETS:
[{IMS_SEQUENCE_ID1:"1569"},
{IMS_SEQUENCE_ID2:"10000"},
{IMS_SEQUENCE_ID3:"15456"}]

FIG. 22C

FACILITATING MANAGEMENT OF IMS METADATA FOR SCENE MEDIA

CROSS-REFERENCES TO RELATED APPLICATIONS

The present application claims priority from U.S. Provisional Application Nos. 63/525,958 and 63/525,959 filed on Jul. 10, 2023, from U.S. Provisional Application Nos. 63/526,136, and 63/526,143 filed on Jul. 11, 2023, and from from U.S. Provisional Application No. 63/528,300, filed on Jul. 21, 2023, the disclosures of which are incorporated herein in their entireties.

FIELD

The present disclosure describes embodiments generally related to architectures, structures and components for systems and networks that distribute media, including video, audio, geometric (3D) objects, haptics, associated metadata, or other content for a client device. Particular embodiments are directed systems, structures, and architectures for distribution of media content to heterogenous immersive and interactive client devices.

BACKGROUND

"Immersive Media" generally refers to media that stimulates any or all human sensory systems (visual, auditory, somatosensory, olfactory, and possibly gustatory) to create or enhance the perception of the user being physically present in the experience of the media, i.e., beyond what is distributed over existing (e.g., "legacy") commercial networks for timed two-dimensional (2D) video and corresponding audio; such timed media also being known as "legacy media".

Yet another definition for "immersive media" is media that attempt to create, or imitate the physical world through digital simulation of kinetics and laws of physics, thereby stimulating any or all human sensory systems so as to create the perception by the user of being physically present inside a scene that depicts a real or virtual world.

Immersive media-capable presentation devices may refer to devices equipped with sufficient resources and capabilities to access, interpret, and present immersive media. Such devices are heterogeneous in terms of the quantities and formats of the media that they may support in terms of media provided by a network. Likewise, media are heterogenous in terms of the amount and types of network resources required to distribute such media at scale. "At scale" may refer to the distribution of media by service providers that achieve distribution equivalent to that of legacy video and audio media over networks, e.g., Netflix, Hulu, Comcast subscriptions, and Spectrum subscriptions.

In contrast, legacy presentation devices such as laptop displays, televisions, and mobile handset displays are homogenous in their capabilities because these devices are currently comprised of rectangular display screens that consume frame-based 2D rectangular video or still images as their primary visual media formats. Some of the frame-based visual media formats commonly used in legacy presentation devices may include High Efficiency Video Coding/H.265, Advanced Video Coding/H.264, and Versatile Video Coding/H.266, for video media.

The term "frame-based" media refers to the characteristic that the visual media are comprised of one or more consecutive rectangular frames of imagery. In contrast, "scene-based" media refers to visual media that are organized by "scenes" in which each scene refers to individual assets that collectively describe the visual scene.

A comparative example between frame-based and scene-based visual media is illustrated in the case of visual media illustrating a forest. In the frame-based representation, the forest is captured using camera devices such as those provided on mobile phones. The user enables the camera to focus on the forest and the frame-based media that is captured by the phone is the same as what the user sees through the camera viewport provided on the phone, including any movement of the camera initiated by the user. The resulting frame-based representation of the forest is the series of 2D images that are recorded by the camera usually at a standard rate of 30 frames-per-second or 60 frames-per-second. Each image is a collection of pixels where the information stored in each pixel is congruent, one pixel to the next.

In contrast, a scene-based representation of a forest is comprised of individual assets that describe each of the objects in the forest, and a human-readable scene graph description that presents a myriad of metadata that describe the assets or how the assets are to be rendered. For example, the scene-based representation may include individual objects called "trees" where each tree is comprised of a collection of smaller assets called "trunks," "branches," and "leaves." Each tree trunk may be further described individually by a mesh that describes the full 3D geometry of the trunk and a texture that is applied to the tree-trunk mesh to capture the color and radiance properties of the trunk. Furthermore, the trunk may be accompanied by additional information that describes the surface of the trunk in terms of its smoothness or roughness or ability to reflect light. The corresponding human-readable scene graph description may provide information as to where to place the tree trunks relative to the viewport of a virtual camera that is focused into the forest scene. Furthermore the human-readable description may include information as to how many branches to generate and where to place them into the scene from the single branch asset called "branch." Likewise the description may include how many leaves to generate and the position of the leaves relative to the branches and the tree trunks. Moreover, a transformation matrix may provide information as to how to scale or rotate the leaves so that the leaves do not appear homogenous. Overall, the individual assets that comprise the scene vary in terms of the type and quanities of information that is stored in each asset. Each asset is usually stored in its own file, but often the assets are used to create multiple instances of the objects that they are designed to create, e.g., the branches and leaves for each tree.

Those that are skilled in the art may appreciate that the human-readable portion of a scene graph is rich in metadata to not only describe the relationships of assets to their position within the scene, but also instructions as to how to render the object, e.g., with various types of light sources, or with surface properties (to indicate the object has a shiny metallic vs. matte surface) or other materials (porous or smooth texture). Other information often stored in the human readable portion of the graph is the relationship of assets with other assets, e.g., to form groups of assets that are rendered or handled as a single entity, e.g., the tree trunks with branches and leaves.

Examples of scene graphs with human readable components include glTF 2.0 where the node-tree component is provided in Jave Script Obejct Notation (JSON) which is a human-readable notation to describe objects. Another example of a scene graph with a human readable component is the Immersive Technologies Media Format in which the OCS file is generated using XML, another human-readable notation format.

Yet another difference between scene-based and frame-based media is that in frame-based media the view that is created for the scene is identical to the view that the user captured via the camera, i.e., at the time that the media was created. When the frame-based media is presented by a client, the view of the media that is presented is the same as the view that is captured in the media, e.g., by the camera that was used to record the video. With scene-based media, however, there may be multiple ways for the user to view the scene using a variety of virtual camera, e.g., a thin-lens camera vs. a panoramic camera.

The distribution of any media over networks may employ media delivery systems and architectures that reformat the media from an input or network "ingest" media format to a distribution media format where that distribution media format is not only suitable to be ingested by the targeted client device and its applications, but is also conducive to being "streamed" over the network. Thus there may be two processes that are performed upon the ingested media by the network: 1) converting the media from a format A into a format B that is suitable to be ingested by the target client, i.e., based upon the client's capabilities to ingest certain media formats, and 2) preparing the media to be streamed.

"Streaming" of media broadly refers to the fragmenting and or packetizing of the media so that it can be delivered over the network in consecutive smaller-sized "chunks" logically organized and sequenced according to either or both the media's temporal or spatial structure. "Transforming," which is sometimes referred to as "transcoding," of media from a format A to a format B may be a process that is performed, usually by the network or by the service provider, prior to distributing the media to the client. Such transcoding may be comprised of converting the media from a format A to a format B based upon prior knowledge that format B is somehow a preferred format, or the only format, that can be ingested by the target client, or is better suited for distribution over a constrained resource such as a commercial network. In many cases, but not all, both steps of transforming the media and preparing the media to be streamed are necessary before the media can be received and processed by the client from the network.

The above one or two-step processes acted upon the ingested media by the network, i.e., prior to distributing the media to the client, results in a media format referred to as a "distribution media format," or simply, the "distribution format." In general, these steps should be performed only once, if performed at all for a given media data object, if the network has access to information to indicate that the client will need the transformed and or streamed media object for multiple occasions that otherwise would trigger the transformation and streaming of such media multiple times. That is, the processing and transfer of data for transformation and streaming of media is generally regarded as a source of latency with the requirement for expending potentially significant amount of network and or compute resources. Hence, a network design that does not have access to information to indicate when a client potentially already has a particular media data object stored in its cache or stored locally with respect to the client, will perform suboptimally to a network that does have access to such information.

For legacy presentation devices, the distribution format may be equivalent or sufficiently equivalent to the "presentation format" ultimately used by the client presentation device to create the presentation. That is, a presentation media format is a media format whose properties (resolution, framerate, bit-depth, colour gamut, etc, . . . ) are closely tuned to the capabilities of the client presentation device. Some examples of distribution vs. presentation formats include: a High-Definition (HD) video signal (1920 pixel columns×1080 pixel rows) distributed by a network to an Ultra-high-definition (UHD) client device with resolution (3840 pixel columns×2160 pixel rows). In this scenario, the UHD client will apply a process called "super-resolution" to the HD distribution format to increase the resolution of the video signal from HD to UHD. Thus the final signal format that is presented by the client device is the "presentation format" which, in this example, is a UHD signal, whereas the HD signal comprises the distribution format. In this example, the HD signal distribution format is very similar to the UHD signal presentation format because both signals are in a rectilinear video format, and the process to convert the HD format to a UHD format is a relatively straightforward and easy process to perform on most legacy client devices.

Alternatively, the preferred presentation format for the targeted client device may be significantly different from the ingest format received by the network. Nevertheless, the client may have access to sufficient compute, storage, and bandwidth resources to transform the media from the ingest format into the necessary presentation format suitable for presentation by the client. In this scenario, the network may bypass the step of reformatting the ingested media, e.g. "transcoding" the media, from a format A to a format B simply because the client has access to sufficient resources to perform all media transforms without the network having to do so aprioi. However, the network may still perform the step of fragmenting and packaging the ingest media so that the media may be streamed to the client.

Yet another alternative is that the ingested media received by the network is significantly different from the client's preferred presentation format, and the client does not have access to sufficient compute, storage, and or bandwidth resources to convert the media to the preferred presentation format. In such a scenario, the network may assist the client by performing some or all of the transformation from the ingest format into a format that is either equivalent or nearly equivalent to the cleint's preferred presentation format on behalf of the client. In some architecture designs, such assistance provided by the network on behalf of the client is commonly referred to as "split rendering" or "adaptation" of the media.

With respect to the goal of translating one scene graph format X to another scene graph format Y, there are multiple problems to solve as follows. A first problem is to define a generic translation between two representations of the same type of media object, media attribute, or rendering function to be performed.

A second problem is to annotate the individual objects and other parts of the scene graph for a specific instance of a scene graph, e.g., a scene graph representation using format X, with the metadata comprising the IMS. That is, the metadata used to annotate a specific instance of a scene graph should be directly relatable to the corresponding individual media objects, media attributes, and rendering features of the scene graph with representation using format X. Using the above example of a static mesh, there may be multiple static meshes used throughout a specific scene graph.

SUMMARY

A method for processing annotations in an immersive media stream, the method being executed by at least one processor, and the method including determining, by the first processor, whether a set of metadata associated with a portion of the received immersive media stream is coherent with the portion of the received immersive media stream based on predefined criteria; generating, by the first processor, an alignment indicator based on determining that the set of metadata associated with the portion of the received immersive media stream is incoherent; annotating, by the first processor, the portion of the received immersive media stream to facilitate subsequent access and interpretation of the set of metadata by a second processor that is different from the first processor; and storing, by the first processor, supporting information in addition to the set of metadata, wherein the supporting information describes the portion of the received immersive media stream such that an interpretation process is not needed to access and interpret the set of metadata and the portion of the received immersive media stream.

A non-transitory computer-readable medium storing instructions for processing annotations in an immersive media stream, the instructions including one or more instructions that, when executed by one or more processors of a device, cause the one or more processors to: determine, by a first processor, whether a set of metadata associated with a portion of received immersive media stream is coherent with the portion of the received immersive media stream based on predefined criteria; and annotate, by the first processor, the portion of the received immersive media stream to facilitate subsequent access and interpretation of the set of metadata by a second processor that is different from the first processor, wherein the annotating enables the subsequent access and interpretation of the portion of the received immersive media stream without an interpretation process.

A device for processing annotations in an immersive media stream, the device including at least one memory configured to store program code; and at least one processor configured to read the program code and operate as instructed by the program code. The program code may include determining code configured to cause the at least one processor to determine whether a set of metadata associated with a portion of received immersive media stream is coherent with the portion of the received immersive media stream based on predefined criteria; and annotating code configured to cause the at least one processor to annotate the set of metadata while preserving integrity of the set of metadata without replacing the set of metadata partially or entirely, wherein the augmenting comprises adding supporting information in addition to the set of metadata to facilitate subsequent access and interpretation of the set of metadata by a second processor that is different from a first processor.

BRIEF DESCRIPTION OF THE DRAWINGS

FIG. 15 depicts an expanded example of the architecture depicted in FIG. 14, according to an embodiment.

FIGS. 22A-C Depicts an example of supporting information for IMS metadata and the annotated scene media, according to an embodiment.

DETAILED DESCRIPTION

Figure 1:
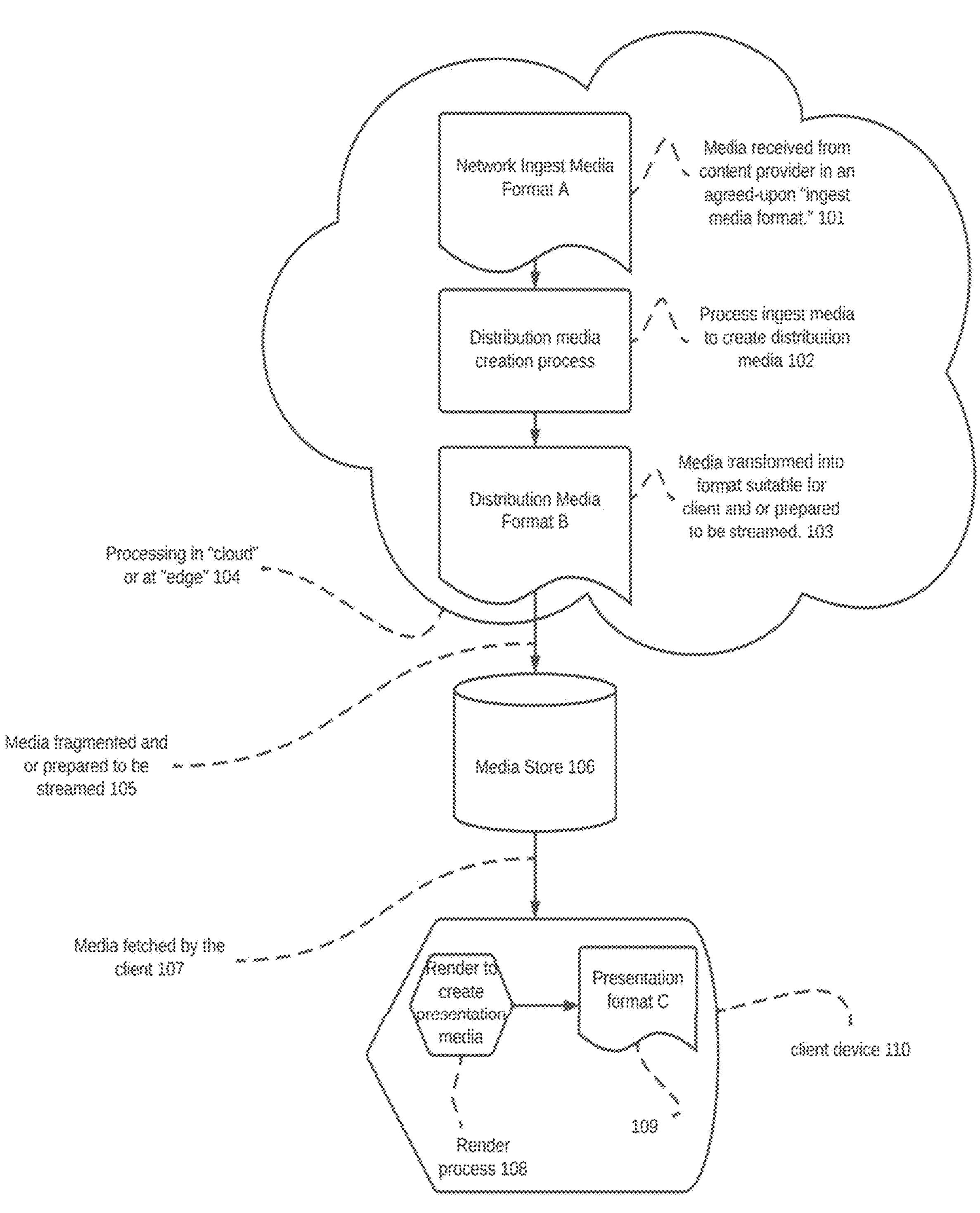
FIG. 1 is a schematic illustration of the flow of immersive media through a network for distribution to a client, according to an embodiment.

FIG. 1 illustrates a Media Flow Process 100 including a general sequence of steps that may be executed by a network cloud or edge device 104. Media that is stored in an ingest media format A is received by the network from a content provider at step 101. A network process step 102 prepares the media for distribution to the client by formatting the media into a format B and or by preparing the media to be streamed to the client 108. The media is streamed from 104 to the client via network connection 105. Client 108 receives, or fetches from the network, the distribution media and optionally prepares the media for presentation via a render process 106. The output of render process 106 is the presentation media in yet another potentially different format C at 107.

Figure 2:
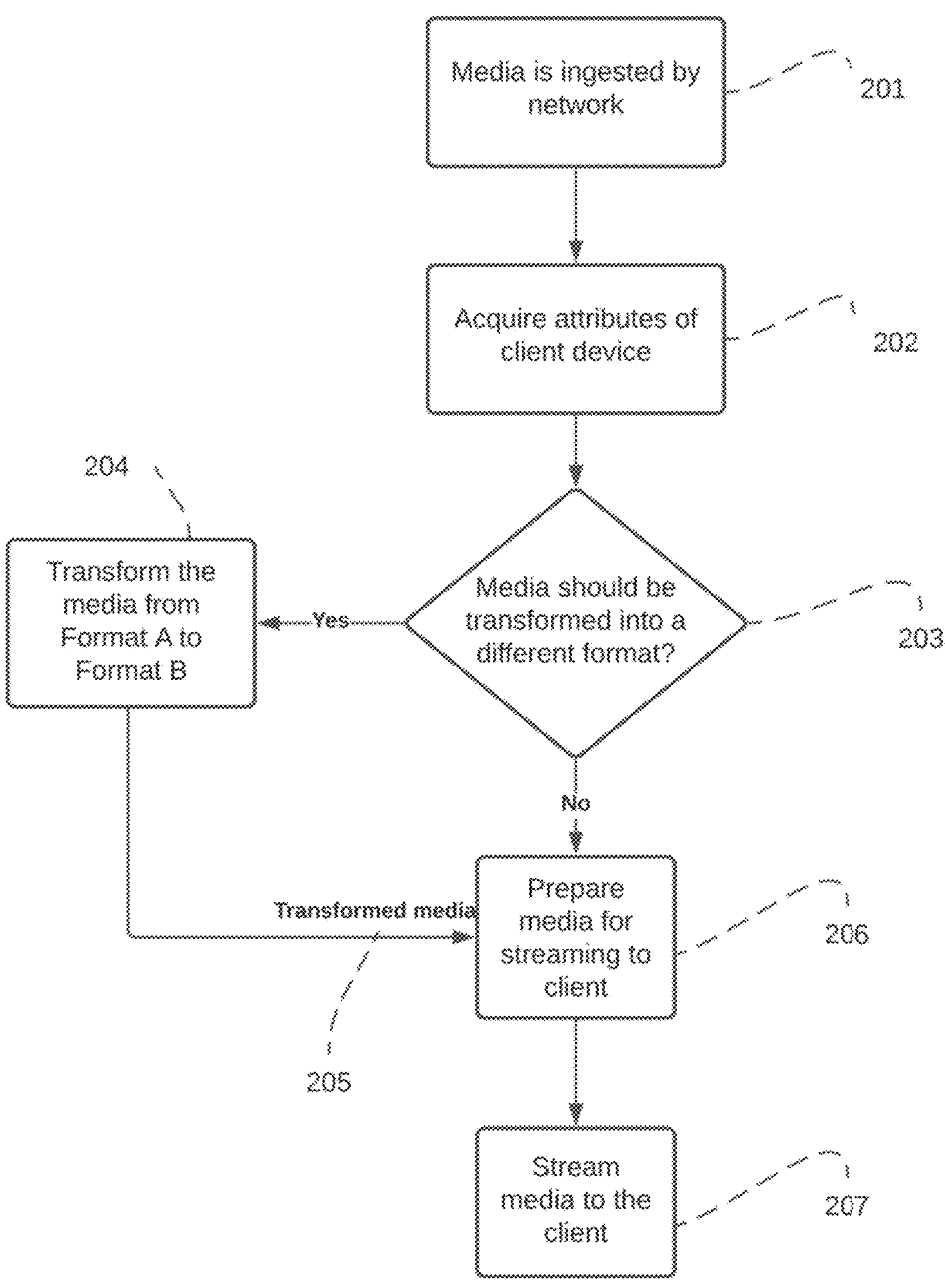
FIG. 2 is a schematic illustration of the flow of immersive media through a network prior to distributing the media to the client, according to an embodiment.

FIG. 2 depicts a Media Transform Decision Making Process 200 that illustrates the network logic flow for processing ingested media through either a manual or automated process within the network. At operation 201, the media is ingested by a network from a content provider. The attributes for the targeted client, if not already known, are acquired at operation 202. A decision making operation 203 determines if the network should assist with the transformation of the media, if needed. The ingested media is transformed by an operation 204 to convert the media from a Format A into a Format B producing tranformed media 205 if and only if the decision making step determines that the network must or should assist with the transformation. At operation 206, the media, either transformed or in its original form, is prepared to be streamed.

An important aspect to the logic in FIG. 2 is the decision making operation 203 that may be performed either by a human, or by an automated process. That decision making step must determine whether the media can be streamed in its original ingested format A, or if it must be transformed into a different format B to facilitate the presentation of the media by the client.

Such a decision making operation 203 may require access to information where that information describes aspects or features of the ingest media, in such a way so as to aid the operation 203 to make an optimal choice, i.e., to determine if a transformation of the ingest media is needed prior to streaming the media to the client, or if the media should be streamed in its original ingest format A directly to the client.

Given each of the above scenarios where transformations of media from a format A to another format may be done either entirely by the network, entirely by the client, or jointly between both the network and the client, e.g., for split rendering, it becomes apparent that a lexicon of attributes that describe a media format may be needed so that both the client and network have complete information to characterize the media and the work that must be done. Furthermore, a lexicon that provides attributes of a client's capabilities, e.g., in terms of available compute resources, available storage resources, and access to bandwidth may likewise be needed. Even further, a mechanism to characterize the level of compute, storage, or bandwidth complexity of an ingest format is needed so that a network and client may jointly, or singly, determine if or when the network may employ a split-rendering step for distributing the media to the client. Additionally, if the transformation and or streaming of a particular media object that is or will be needed by the client to complete the presentation has already been done as part of the work to process prior scenes for the presentation, then the network might altogether skip the steps of transform and or streaming of the ingest media assuming that the client still has access or availability to the media that was previously streamed to the client. Finally, if the transformation from a Format A to another format is determined to be a necessary step to be performed either by or on behalf of the client, then a prioritization scheme for ordering the transformation processes of individual assets within the scene may benefit an intelligent and efficient network architecture.

One example of such a lexicon of attributes to characterize the media is the so-called Independent Mapping Space (IMS) nomenclature that is designed to facilitate translation from one scene-graph format to another, and potentially entirely different, scene-graph format. The Independent Mapping Space is defined in Part 28 of the ISO/IEC 23090 suite of standards; such suite is informally known as "MPEG-I." According to the scope of Part 28, the IMS is comprised of metadata and other information that describe commonly used aspects of scene-based media formats. For example, scene-based media may commonly provide mechanisms to describe the geometry of a visual scene. One aspect of the IMS in ISO/IEC 23090 Part 28 is to provide standards-based metadata that can be used to annotate the human-readable portion of a scene graph (also known as "scene description") so that the annotation guides the translation from one format to another, e.g. from one scene geometry description to another scene geometry description. The same may be true of cameras; i.e., many scene graph formats provide a means to describe the features of a virtual camera that can be used as part of the rendering process to create a viewport into the scene. The IMS in Part 28 likewise provides metadata to describe commonly used camera types. The purpose of the IMS is to provide a nomenclature that can be used to describe the commonly-used aspects across multiple scene graph formats, so that the translation from one format to another is guided by the IMS.

Another important aspect of ISO/IEC 23090 Part 28 is that there is no specified way to complete the translation from one format to another format. In this regard, the IMS simply provides guidance for how to characterize common features of all scene graphs. Apart from the geometry and camera features of a scene graph, other common features of scenes include lighting, and object surface properties such as albedo, materials, roughness, and smoothness.

With respect to the goal of translating one scene graph format X to another scene graph format Y, there are multiple problems to solve as follows. A first problem is to define a generic translation between two representations of the same type of media object, media attribute, or rendering function to be performed. For example, the IMS metadata for a static mesh object may be expressed with a generic code such as: IMS_STATIC_MESH. A scene graph represented by the syntax of format X may refer to a static mesh using an identifier such as: FORMAT_X_STATIC_MESH, whereas a scene graph represented by the syntax of format Y may refer to a static mesh using an identifier such as: FORMAT_Y_STATIC_MESH. The definition of a generic translation via the use of the IMS in ISO/IEC 23090 Part 28 may include the mappings of FORMAT_X_STATIC_MESH to IMS_STATIC_MESH, and FORMAT_Y_STATIC_MESH to IMS_STATIC_MESH. Hence, a generic translation from format X static mesh to format Y static mesh is facilitated through the use of the metadata IMS_STATIC_MESH from IMS of ISO/IEC 23090 Part 28.

A second problem is to annotate the individual objects and other parts of the scene graph for a specific instance of a scene graph, e.g., a scene graph representation using format X, with the metadata comprising the IMS. That is, the metadata used to annotate a specific instance of a scene graph should be directly relatable to the corresponding individual media objects, media attributes, and rendering features of the scene graph with representation using format X. Using the above example of a static mesh, there may be multiple static meshes used throughout a specific scene graph.

With respect to the problem of annotating the scene-based media, it becomes apparent that a standards-based method to do so is needed in order to facilitate interchange and interoperability across a variety of systems that ingest or distribute immersive media. Such a method should support typical use cases both for how the metadata and media are used and maintained, for instance, creating the media and the adding the metadata to describe the media may be accomplished by two separate processors; editing the media may be accomplished by a processor that does not simultaneously update any existing metadata; and the need to completely remove any metadata that may be exist for the media. These scenarios give rise to a set of requirements that can be construed to be important such that a standards-based method for annotation of scene media should address them. These requirements may include:

First: that the metadata and the media it describes should remain coherent. That is, once the media is annotated, then any subsequent change made to the media (e.g., a modification to the texture of a tree described by the scene-based media resulting in a change for how the media is rendered) should result in an indicator that the metadata and the media may no longer be aligned. Such an indicator would facilitate the processing of the metadata by a separate processor that does so, e.g., a processor to translate the media from a format X to a format Y.

Second: the annotation method should provide supporting information to facilitate the subsequent access and interpretation of IMS metadata by a separate processor. That is, the annotation processor should store supporting information that facilitates subsequent access and intpretation of IMS metadata by a separate processor that accesses and interprets the IMS metadata.

Third: the annotation method should store supporting information along with the IMS metadata itself to efficiently describe a portion of scene media such that the supporting information provides a general description of the scene media without the need for an interpretation process to fully access and interpret all the IMS metadata and scene media. That is, the annotation method should provide a means by which a summary of the type of the media that is annotated can be ascertained without the interpretation process having to examine each of the individual components of the media.

Fourth: the annotation method should support the ability to update and or augment existing metadata for a scene media that is already been annotated.

An embodiment of present disclosure provided herein describes a method, device, system, and a non-transitory computer readable medium to address the second requirement listed above. The present disclosure includes methods by which access and interpretation of IMS metadata for scene media is facilitated without an annotation interpretation processor having to parse the entire scene and its corresponding metadata to interpret the metadata and or discover the types of IMS systems that are in use within the annotated media. That is, the annotation processor could store supporting information that facilitates subsequent access and intpretation of IMS metadata by a separate processor that accesses and interprets the IMS metadata.

An embodiment of present disclosure provided herein describes a method, device, system, and a non-transitory computer readable medium to address the second and fourth requirements listed above. The present disclosure includes methods by which an annotation processor that augments the IMS annotation for scene media that has previously been annotated have access to supporting information that facilitates the subsequent annotation update of scene media that has previously been annotated. That is, given scene media that has been annotated with IMS metadata, an annotation processor should be able to augment the existing annotated metadata without having to replace the already existing IMS metadata.

An embodiment of the present disclosure includes methods by which an annotation processor 1 can provide information that facilitates the subsequent update and or access of the IMS metadata by a processor 2. That is, given that there may be multiple processors that access, interpret, and or update the IMS metadata for a scene media, and that the IMS metadata should remain coherent with the scene media itself, a means by which efficient update and access can be achieved without compromising the coherence between the IMS metadata and the scene media is a desired feature of a system that uses IMS metadata.

Relevant Definitions of some of the terms used in the present disclosure are below.

Scene graph: general data structure commonly used by vector-based graphics editing applications and modern computer games, which arranges the logical and often (but not necessarily) spatial representation of a graphical scene; a collection of nodes and vertices in a graph structure.

Scene: in the context of computer graphics, a scene is a collection of objects (e.g., 3D assets), object attributes, and other metadata that comprise the visual, acoustic, and physics-based characteristics describing a particular setting that is bounded either by space or time with respect to the interactions of the objects within that setting.

Node: fundamental element of the scene graph comprised of information related to the logical or spatial or temporal representation of visual, audio, haptic, olfactory, gustatory, or related processing information; each node shall have at most one output edge, zero or more input edges, and at least one edge (either input or output) connected to it.

Base Layer: a nominal representation of an asset, usually formulated to minimize the compute resources or time needed to render the asset, or the time to transmit the asset over a network.

Enhancement Layer: a set of information that when applied to the base layer representation of an asset, augments the base layer to include features or capabilities that are not supported in the base layer.

Attribute: metadata associated with a node used to describe a particular characteristic or feature of that node either in a canonical or more complex form (e.g. in terms of another node).

Binding LUT: a logical structure that associates metadata from the IMS of ISO/IEC 23090 Part 28 with metadata or other mechanisms used to describe features or functions of a specific scene graph format, e.g. ITMF, glTF, Universal Scene Description.

Container: a serialized format to store and exchange information to represent all natural, all synthetic, or a mixture of synthetic and natural scenes including a scene graph and all of the media resources that are required for rendering of the scene Serialization: the process of translating data structures or object state into a format that can be stored (for example, in a file or memory buffer) or transmitted (for example, across a network connection link) and reconstructed later (possibly in a different computer environment). When the resulting series of bits is reread according to the serialization format, it can be used to create a semantically identical clone of the original object.

Renderer: a (typically software-based) application or process, based on a selective mixture of disciplines related to: acoustic physics, light physics, visual perception, audio perception, mathematics, and software development, that, given an input scene graph and asset container, emits a typically visual and/or audio signal suitable for presentation on a targeted device or conforming to the desired properties as specified by attributes of a render target node in the scene graph. For visual-based media assets, a renderer may emit a visual signal suitable for a targeted display, or for storage as an intermediate asset (e.g. repackaged into another container i.e. used in a series of rendering processes in a graphics pipeline); for audio-based media assets, a renderer may emit an audio signal for presentation in a multi-channel loudspeaker and/or binauralized headphones, or for repackaging into another (output) container. Popular examples of renderers include the real-time rendering features of the game engines Unity and Unreal Engine.

Evaluate: produces a result (e.g. similar to evaluation of a Document Object Model for a webpage) that causes the output to move from an abstract to a concrete result.

Scripting language: An interpreted programming language that can be executed by a renderer at runtime to process dynamic input and variable state changes made to the scene graph nodes, which affect rendering and evaluation of spatial and temporal object topology (including physical forces, constraints, inverse kinematics, deformation, collisions), and energy propagation and transport (light, sound).

Shader: a type of computer program that was originally used for shading (the production of appropriate levels of light, darkness, and color within an image) but which now performs a variety of specialized functions in various fields of computer graphics special effects or does video post-processing unrelated to shading, or even functions unrelated to graphics at all.

Path Tracing: a computer graphics method of rendering three-dimensional scenes such that the illumination of the scene is faithful to reality.

Timed media: Media that is ordered by time; e.g., with a start and end time according to a particular clock.

Untimed media: Media that is organized by spatial, logical, or temporal relationships; e.g., as in an interactive experience that is realized according to the actions taken by the user(s).

Neural Network Model: a collection of parameters and tensors (e.g., matrices) that define weights (i.e., numerical values) used in well defined mathematical operations applied to the visual signal to arrive at an improved visual output which may include the interpolation of new views for the visual signal that were not explicitly provided by the original signal.

glTF extensions: glTF defines an extension mechanism that allows the base glTF format to be extended with new capabilities. Any glTF object may have an optional extensions property.

IMS: Independent Mapping Space metadata that is standardized in ISO/IEC 23090 Part 28.

In the last decade, a number of immersive media-capable devices have been introduced into the consumer market, including head-mounted displays, augmented-reality glasses, hand-held controllers, multi-view displays, haptic gloves, and game consoles. Likewise, holographic displays and other forms of volumetric displays are poised to emerge into the consumer market within the next three to five years. Despite the immediate or imminent availability of these devices, a coherent end-to-end ecosystem for the distribution of immersive media over commercial networks has failed to materialize for several reasons.

One of the impediments to realizing a coherent end-to-end ecosystem for distribution of immersive media over commercial networks is that the client devices that serve as end-points for such a distribution network for immersive displays are all very diverse. Some of them support certain immersive media formats while others do not. Some of them are capable of creating an immersive experience from legacy raster-based formats, while others cannot. Unlike a network designed only for distribution of legacy media, a network that must support a diversity of display clients needs a significant amount of information pertaining to the specifics of each of the client's capabilities, and the formats of the media to be distributed, before such network can employ an adaptation process to translate the media into a format suitable for each target display and corresponding application. Such a network, at a minimum, would need access to information describing the characteristics of each target display and the characteristics and complexity of the ingested media in order for the network to ascertain how to meaningfully adapt an input media source to a format suitable for the target display and application.

Likewise, an ideal network supporting hetereogeneous clients should leverage the fact that some of the assets that are adapted from an input media format to a specific target format may be reused across a set of similar display targets. That is, some assets, once converted to a format suitable for a target display may be reused across a number of such displays that have similar adaptation requirements. Therefore, such an ideal network would employ a caching mechanism to store adapted assets into an area that is relatively immutable, i.e., similar to the use of Content Distribution Networks (CDNs) in use for legacy networks.

Moreover, immersive media may be organized into "scenes" that are described by scene graphs, which are also known as scene descriptions. The scope of a scene graph is to describe visual, audio, tactile and other forms of immersive assets that comprise a particular setting that is part of a presentation, for example, the actors and events taking place in a particular location in a building that is part of a presentation, e.g., movie. A list of all scenes that comprise a single presentation may be formulated into a manifest of scenes.

An additional benefit of such an approach is that for content that is prepared in advance of having to distribute such content, a "bill of materials" may be created that identifies all of the assets that will be used for the entire presentation, and how often each asset is used across the various scenes within the presentation. An ideal network should have knowledge of the existence of cached resources that can be used to satisfy the asset requirements for a particular presentation. Similarly a client that is presenting a series of scenes may wish to have knowledge about the frequency of any given asset to be used across multiple scenes. For example, if a media asset (also known as an object) is referenced multiple times across multiple scenes that are or will be processed by the client, then the client should avoid discarding the asset from its caching resources until the last scene that requires that particular asset has been presented by the client.

Furthermore, such a process that may produce a "bill of materials" for a given scene or collection of scenes may also annotate the scene(s) with standardized metadata, e.g., from the IMS of ISO/IEC 23090 Part 28 to facilitate the adaptation of a scene from one format to another format.

A problem known to those skilled in the art is that there are many systems and processors, i.e., applications, that participate in the ecosystem for media creation, media maintenance, media transcoding, media translation, and media distribution and that given the variety of applications that may effect a change to the media, it is possible that any IMS metadata that may be created for the media during any stage of the media "pipeline" may also be made incoherent with the media itself. That is, any processor 1 that processes the media, e.g., across the media content creation to distribution "pipeline" may likewise break the coherence between the media and the IMS metadata orginally created to describe the media.

The disclosed subject matter addresses the need for a mechanism to indicate when the media and the IMS metadata created for the media may no longer be coherent by "fixity checking." Fixity checking is a type of verification that a file has remained unchanged in terms of its preservation. Such a property is desireable in scenarios where IMS metadata is created for scene-based media by a processor where such scene-based media may subsequently be altered by a separate processor as a means by which metadata interpretation processors can ensure that the metadata and the scene media that are described are coherent.

Note that henceforth the term media object and media asset may be used interchangeably, both refering to a specific instance of a specific format of media data.

As stated above, FIG. 1 is a schematic illustration of a Media Flow Process 100 of media, through a network, for distribution to a client. In FIG. 1, processing of an Ingest Media Format A is performed by a "cloud" or edge process 104. Note that the same processing may be performed a prioi in a manual process or by a client, just as well. Ingest Media 101 is obtained from a content provider (not shown). Process 102 performs any necessary transformations or conditioning of the ingested media to create a potentially alternative representation of the media as a Distribution Format B. Media formats A and B may or may not be representations following the same syntax of a particular media format specification, however the Format B is likely to be conditioned by Process 103 into a scheme that facilitates the distribution of the media over a network protocol such as TCP or UDP. Such "streamable" media is depicted in 105 as media that is streamed to a Media Store 106. Client 110 accesses the media from Store 106 via a Fetching Mechanism 107 (e.g. ISO/IEC 23009 Dynamic Adaptive Streaming over HTTP). Client 110 has access to some rendering capabilities depicted as 108. Such render capabilities 108 may be rudimentary or likewise, sophisticated, depending on the type of client 110 that is being targeted. Render process 108 creates Presentation Media 109 that may or may not be represented according to a third format specification, e.g., Format C.

As stated above, FIG. 2 is a schematic illustration of a flow of media through a network in which a Media Transform Decision Making Process 200 is employed to determine if the network should transform the media prior to distributing the media to a client. In FIG. 2, Ingest Media 201 represented in Format A is provided by a content provider (not depicted) to the network. Operation 202 acquires attributes that describe the processing capabilities of targeted client (not depicted). Decision making operation 203 is employed to determine if the network or the client should perform any format conversions for any of the media assets contained within the Ingested Media 201, e.g., such as a conversion of a particular media object from a Format A to a Format B, prior to the media being streamed to the client. If any of the media assets should be transformed by the network, then the network employs operation 204 to transform the media object from Format A to Format B. Transformed media 205 is the output from operation 204. The transformed media is merged into the preparation operation 206 to prepare the media to be streamed to client (not shown). Operation 207 streams the media to the client or to the media store (e.g., Media Store 106 in FIG. 1).

Figure 3:
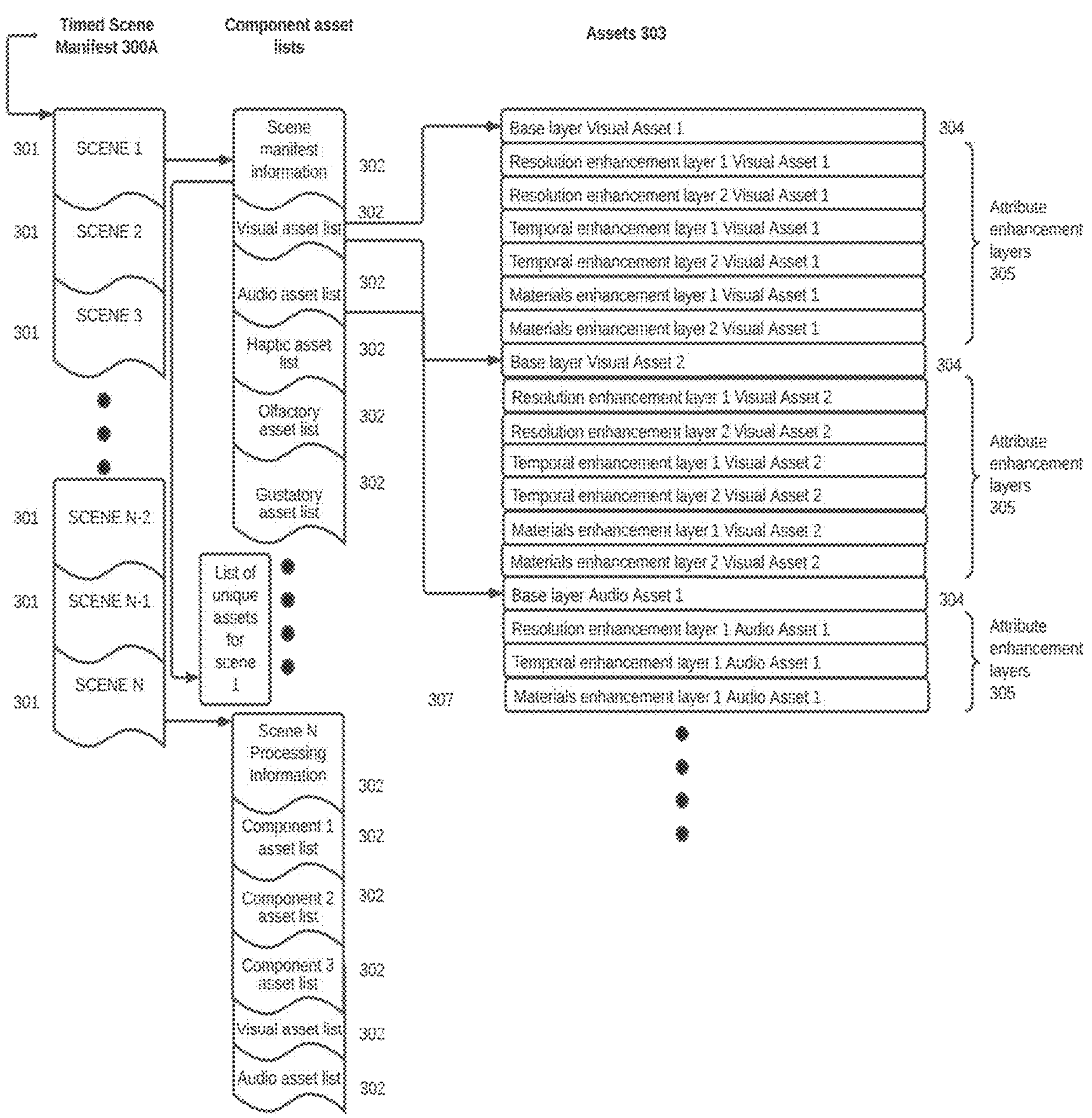
FIG. 3 is an exemplary embodiment of a data-model for the representation and streaming of timed immersive media, according to an embodiment.
Figure 4:
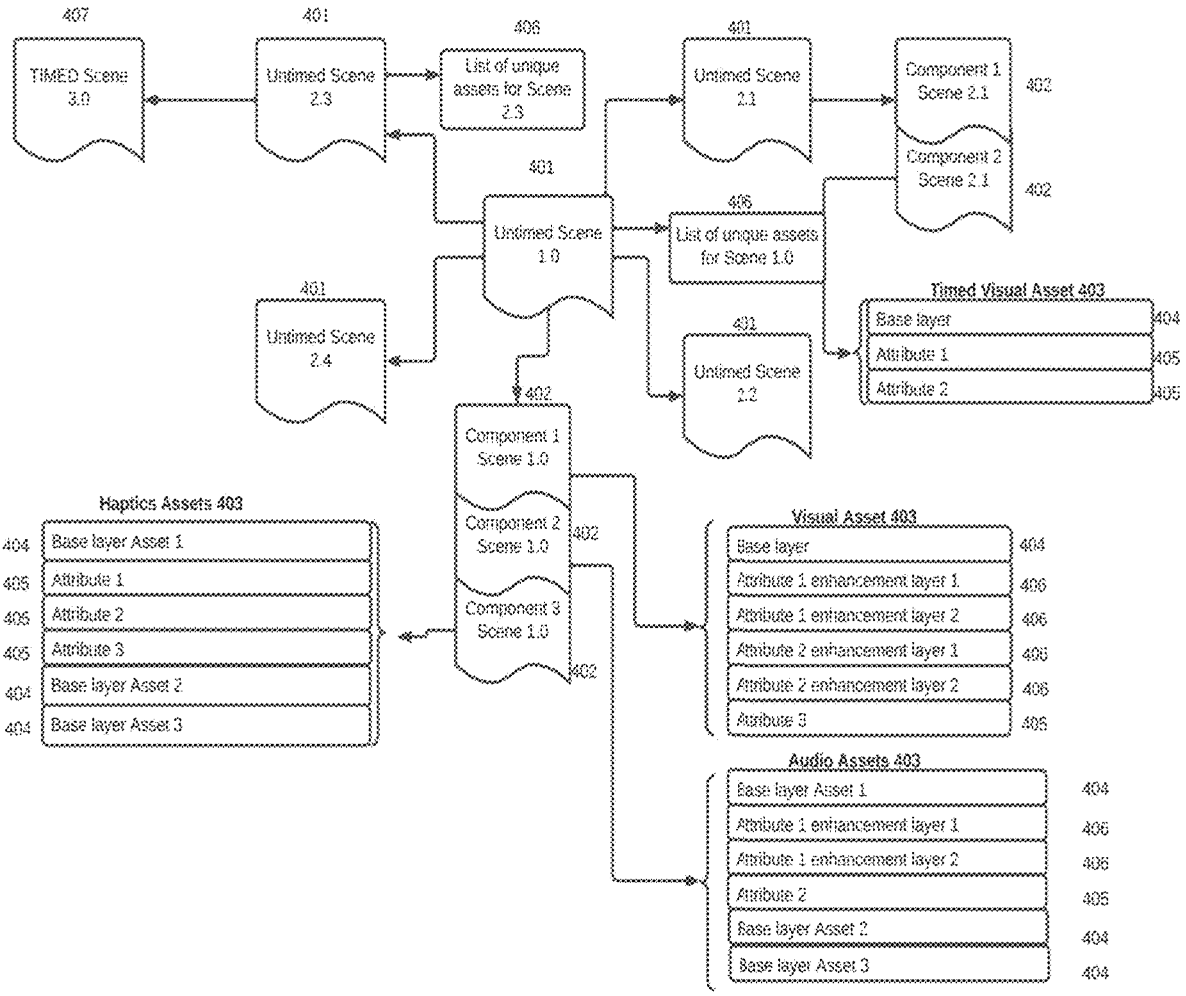
FIG. 4 is an exemplary embodiment of a data-model for the representation and streaming of untimed immersive media, according to an embodiment.

FIG. 3 depicts a Timed Media Representation 300 as an example representation of a streamable format for heterogenous immersive media that is timed. FIG. 4 depicts an Untimed Media Representation 400 as an example representation of a streamable format for heterogeneous immersive media that is untimed. Both figures refer to a Scene; FIG. 3 refers to Scene 301 for timed media and FIG. 4 refers to Scene 401 for untimed media. For both cases, the Scene may be embodied by various scene representations, or scene descriptions.

For example, in some immersive media designs, a scene may be embodied by a Scene Graph, or as a Multi-Plane Image (MPI), or as a Multi-Spherical Image (MSI). Both the MPI and MSI techniques are examples of technologies that aid in the creation of display-agnostic scene representations for natural content, i.e., images of the real world captured simultaneously from one or more cameras. Scene Graph technologies, on the other hand, may be employed to represent both natural and computer-generated imagery in the form of synthetic representations, however, such representations are especially compute-intensive to create for the case when the content is captured as natural scenes by one or more cameras. That is, scene graph representations of naturally-captured content are both time and compute-intensive to create, requiring complex analysis of natural images with techniques of photogrammetry or deep learning or both, in order to create synthetic representations that can subsequently be used to interpolate sufficient and adequate numbers of views to fill a target immersive client display's viewing frustum. As a result, such synthetic representations are presently impractical to consider as candidates for representing natural content, because they cannot practically be created in real-time for consideration of use cases that require real-time distribution. Nevertheless, at present, the best candidate representations for computer generated imagery is to employ the use of a scene graph with synthetic models, as computer generated imagery is created using 3D modeling processes and tools.

Such a dichotomy in optimal representations of both natural and computer generated content suggests that the optimal ingest format for naturally-captured content is different from the optimal ingest format for computer generated content or for natural content that is not essential for real-time distribution applications. Therefore, the disclosed subject matter targets to be robust enough to support multiple ingest formats for visually immersive media, whether they are created naturally through the use of physical cameras or by a computer.

The following are example technologies that embody scene graphs as a format suitable for representing visual immersive media that is created using computer generated techniques, or naturally captured content for which deep learning or photogrammetry techniques are employed to create the corresponding synthetic representations of a natural scene, i.e., not essential for real-time distribution applications.

1. ORBX

ORBX is one of several scene graph technologies that is able to support any type of visual media, timed or untimed, including ray-traceable, legacy (frame-based), volumetric, and other types of synthetic or vector-based visual formats. ORBX is unique from other scene graphs because ORBX provides native support for freely available and/or open source formats for meshes, point clouds, and textures. ORBX is a scene graph that has been intentionally designed with the goal of facilitating interchange across multiple vendor technologies that operate on scene graphs. Moreover, ORBX provides a rich materials system, support for Open Shader Language, a robust camera system, and support for Lua Scripts. ORBX is also the basis of the Immersive Technologies Media Format published for license under royalty-free terms by the Immersive Digital Experiences Alliance (IDEA). In the context of real time distribution of media, the ability to create and distribute an ORBX representation of a natural scene is a function of the availability of compute resources to perform a complex analysis of the camera-captured data and synthesis of the same data into synthetic representations. To date, the availability of sufficient compute for real-time distribution is not practical, but nevertheless, not impossible.

2. Universal Scene Description

Universal Scene Description (USD) is another well-known, and mature scene graph that is popular in the VFX and professional content production communities. USD is integrated into Nvidia's Omniverse platform which is a set of tools for developers for 3D model creation and rendering with Nvidia's GPUs. A subset of USD was published by Apple and Pixar as USDZ. USDZ is supported by Apple's ARKit.

3. glTF2.0 glTF2.0 is the most recent version of the "Graphics Language Transmission Format" specification. This format supports a simple scene graph format that is generally capable of supporting static (untimed) objects in scenes, including "png" and "jpeg" image formats. glTF2.0 supports simple animations, including support for translate, rotate, and scale, of basic shapes described using the glTF primitives, i.e. for geometric objects. glTF2.0 does not support timed media, and hence does not support video nor audio.

4. ISO/IEC 23090 Part 14 Scene Description is an Extension of glTF2.0 that Adds Support for Timed Media, e.g., Video and Audio.

These known designs for scene representations of immersive visual media are provided for example only, and do not limit the disclosed subject matter in its ability to specify a process to adapt an input immersive media source into a format that is suitable to the specific characteristics of a client end-point device.

Moreover, any or all of the above example media representations either currently employ or may employ deep learning techniques to train and create a neural network model that enables or facilitates the selection of specific views to fill a particular display's viewing frustum based on the specific dimensions of the frustum. The views that are chosen for the particular display's viewing frustum may be interpolated from existing views that are explicitly provided in the scene representation, e.g., from the MSI or MPI techniques, or they may be directly rendered from render engines based on specific virtual camera locations, filters, or descriptions of virtual cameras for these render engines.

The disclosed subject matter is therefore robust enough to consider that there is a relatively small but well known set of immersive media ingest formats that is sufficiently capable to satisfy requirements both for real-time or "on-demand" (e.g., non-real-time) distribution of media that is either captured naturally (e.g., with one or more cameras) or created using computer generated techniques.

Interpolation of views from an immersive media ingest format by use of either neural network models or network-based render engines is further facilitated as advanced network technologies such as 5G for mobile networks, and fibre optical cable for fixed networks are deployed. That is, these advanced network technologies increase the capacity and capabilities of commercial networks because such advanced network infrastructures can support transport and delivery of increasingly larger amounts of visual information. Network infrastructure management technologies such as Multi-access Edge Computing (MEC), Software Defined Networks (SDN), and Network Functions Virtualization (NFV), enable commercial network service providers to flexibly configure their network infrastructure to adapt to changes in demand for certain network resources, e.g., to respond to dynamic increases or decreases in demand for network throughputs, network speeds, roundtrip latency, and compute resources. Moreover, this inherent ability to adapt to dynamic network requirements likewise facilitates the ability of networks to adapt immersive media ingest formats to suitable distribution formats in order to support a variety of immersive media applications with potentially heterogenous visual media formats for heterogenous client end-points.

Immersive Media applications themselves may also have varying requirements for network resources including gaming applications which require significantly lower network latencies to respond to real-time updates in the state of the game, telepresence applications which have symmetric throughput requirements for both the uplink and downlink portions of the network, and passive viewing applications that may have increased demand for downlink resources depending on the type of client end-point display that is consuming the data. In general, any consumer-facing application may be supported by a variety of client end-points with various onboard-client capabilities for storage, compute, and power, and likewise various requirements for particular media representations.

The disclosed subject matter therefore enables a sufficiently equipped network, i.e., a network that employs some or all of the characteristics of a modern network, to simultaneously support a plurality of legacy and immersive media-capable devices according to features that are specified within that:

1. Provide flexibility to leverage media ingest formats that are practical for both real-time and "on demand" use cases for the distribution of media.
2. Provide flexibility to support both natural and computer generated content for both legacy and immersive-media capable client end-points.
3. Support both timed and untimed media.
4. Provide a process for dynamically adapting a source media ingest format to a suitable distribution format based on the features and capabilities of the client end-point, as well as based on the requirements of the application.
5. Ensure that the distribution format is streamable over IP-based networks.
6. Enable the network to simultaneously serve a plurality of heterogenous client end-points that may include both legacy and immersive media-capable devices and applications.
7. Provide an exemplary media representation framework that facilitates the organization of the distribution media along scene boundaries.

An end-to-end embodiment of the improvements enabled by the disclosed subject matter is achieved according to the processing and components described in the detailed description of FIGS. 3 through 16 as follows.

FIG. 3 and FIG. 4 both employ a single example encompassing distribution format that has been adapted from an ingest source format to match the capabilities of a specific client end-point. As described above, the media that is shown in FIG. 3 is timed and the media that is shown in FIG.

4 is untimed. The specific encompassing format is robust enough in its structure to accommodate a large variety of media attributes where each may be layered based on the amount of salient information that each layer contributes to the presentation of the media. An example layering process may include a layered representation for media objects by use of a base layer and enhancement layer architecture 1. The media that is streamed according to the encompassing media format is not limited to legacy visual and audio media, but may include any type of media information that is capable of producing a signal that interacts with machines to stimulate the human senses for sight, sound, taste, touch, and smell.
2. The media that is streamed according to the encompassing media format can be both timed or untimed media, or a mixture of both.
3. The encompassing media format is furthermore streamable by enabling a layered representation for media objects by use of a base layer and enhancement layer architecture. In one example, the separate base layer and enhancement layers are computed by application of multi-resolution or multi-tesselation analysis techniques for media objects in each scene. This is analogous to the progressively rendered image formats, for example, as specified in ISO/IEC 10918-1 (JPEG) and/or ISO/IEC 15444-1 (JPEG2000), but not limited to raster-based visual formats. In an example embodiment, a progressive representation for a geometric object could be a multi-resolution representation of the object computed using wavelet analysis.

In another example of the layered representation of the media format, the enhancement layers apply different attributes to the base layer, such as refining the material properties of the surface of a visual object that is represented by the base layer. In yet another example, the attributes may refine the texture of the surface of the base layer object, such as changing the surface from a smooth to a porous texture, or from a matted surface to a glossy surface.

In yet another example of the layered representation, the surfaces of one or more visual objects in the scene may be altered from being Lambertian to being ray-traceable.

In yet another example of the layered representation, the network will distribute the base-layer representation to the client so that the client may create a nominal presentation of the scene while the client awaits the transmission of additional enhancement layers to refine the resolution or other characteristics of the base representation.

4. The resolution of the attributes or refining information in the enhancement layers is not explicitly coupled with the resolution of the object in the base layer as it is today in existing MPEG video and JPEG image standards.
5. The encompassing media format supports any type of information media that can be presented or actuated by a presentation device or machine, thereby enabling the support of heterogenous media formats to heterogenous client end-points. In one embodiment of a network that distributes the media format, the network will first query the client end-point to determine the client's capabilities, and if the client is not capable of meaningfully ingesting the media representation then the network will either remove the layers of attributes that are not supported by the client, or adapt the media from its current format into a format that is suitable for the client end-point. In one example of such adaptation, the network would convert a volumetric visual media asset into a 2D representation of the same visual asset, by use of a Network-Based Media Processing protocol. In another example of such adaptation, the network may employ a neural network process to reformat the media to an appropriate format or optionally synthesize views that are needed by the client end-point.
6. The manifest for a complete or partially-complete immersive experience (live streaming event, game, or playback of on-demand asset) is organized by scenes which is the minimal amount of information that rendering and game engines can currently ingest in order to create a presentation. The manifest includes a list of the individual scenes that are to be rendered for the entirety of the immersive experience requested by the client. Associated with each scene are one or more representations of the geometric objects within the scene corresponding to streamable versions of the scene geometry. One embodiment of a scene representation refers to a low resolution version of the geometric objects for the scene. Another embodiment of the same scene refers to an enhancement layer for the low resolution representation of the scene to add additional detail, or increase tessellation, to the geometric objects of the same scene. As described above, each scene may have more than one enhancement layer to increase the detail of the geometric objects of the scene in a progressive manner.
7. Each layer of the media objects that are referenced within a scene is associated with a token (e.g., URI) that points to the address of where the resource can be accessed within the network. Such resources are analogous to CDN's where the content may be fetched by the client.
8. The token for a representation of a geometric object may point to a location within the network or to a location within the client. That is, the client may signal to the network that its resources are available to the network for network-based media processing.

FIG. 3 depicts a Timed Media Representation 300 including an embodiment of the encompassing media format for timed media as follows. The Timed Scene Manifest includes a list of Scenes 301. The Scene 301 refers to a list of Components 302 that separately describe processing information and types of media assets that comprise Scene 301. Components 302 refer to Assets 303 that further refer to Base Layers 304 and Attribute Enhancement Layers 305. A list of unique assets that have not been previously used in other scenes is provided in 307.

FIG. 4 depicts an Untimed Media Representation 400 including an embodiment of the encompassing media format for untimed media as follows. Information for Scene 401 is not associated with a start and end duration according to a clock. Scene 401 refers to a list of Components 402 that separately describe processing information and types of media assets that comprise Scene 401. Components 402 refer to Assets 403 that further refer to Base Layers 404 and Attribute Enhancement Layers 405 and 406. Furthermore, Scene 401 refers to other Scenes 401 that are for untimed media. Scene 401 also refers to Scene 407 that is for a timed media scene. Lists 406 identify unique assets associated with a particular scene that have not been previously used in higher order (e.g., parent) scenes.

Figure 5:
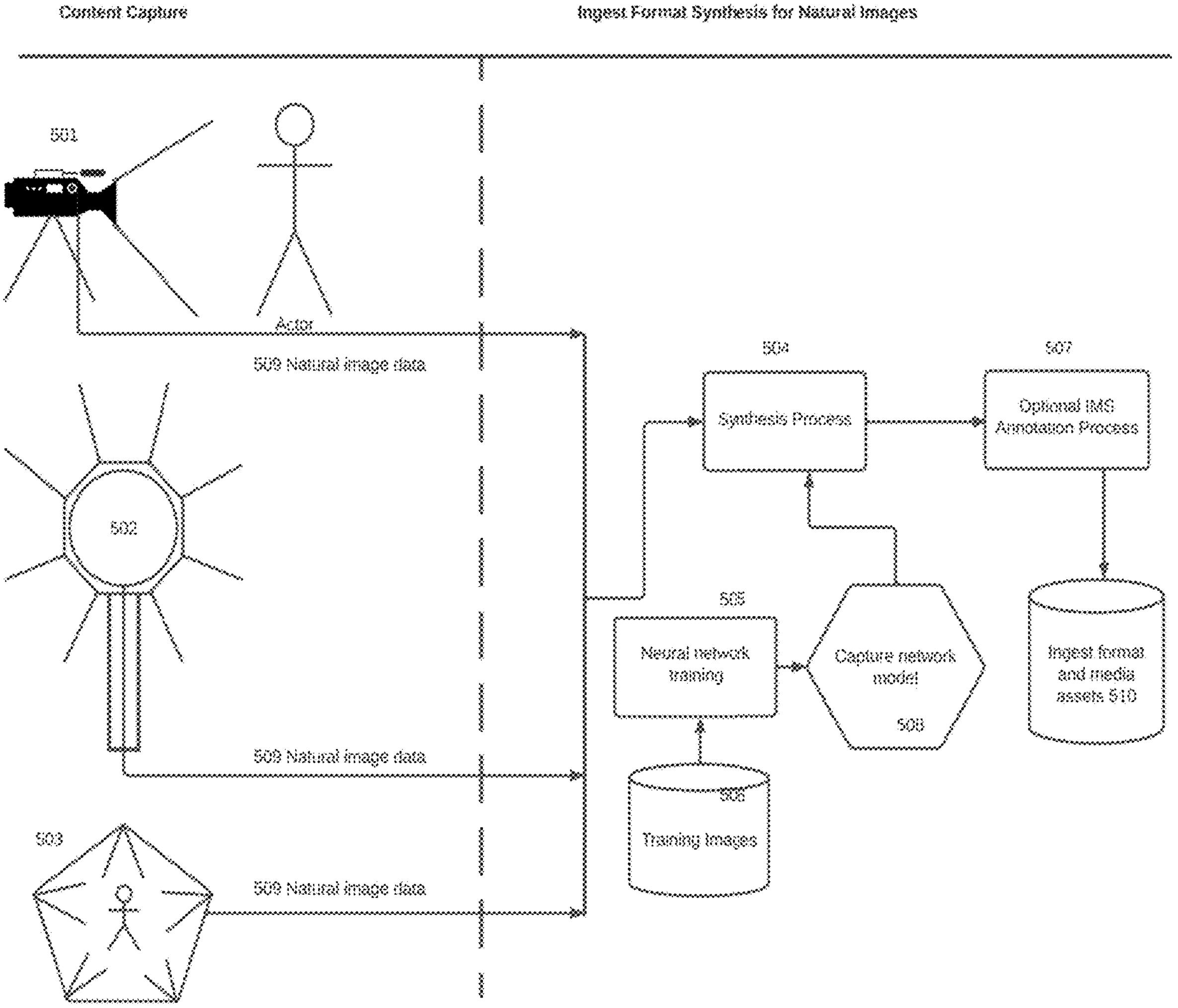
FIG. 5 is a schematic illustration of a process of capturing a natural scene and converting it to an immersive representation that can be used as an ingest format for a network, according to an embodiment.

FIG. 5 illustrates a sample embodiment of a Natural Media Synthesis Process 500 to synthesize an ingest format from natural content. Camera unit 501 uses a single camera lens to capture a scene of a person. Camera unit 502 captures a scene with five diverging fields of view by mounting five camera lenses around a ring-shaped object. The arrangement in 502 is an exemplary arrangement commonly used to capture omnidirectional content for VR applications. Camera unit 503 captures a scene with seven converging fields of view by mounting seven camera lenses on the inner diameter portion of a sphere. The arrangement 503 is an exemplary arrangement commonly used to capture light fields for light field or holographic immersive displays. Natural image content 509 is provided as input to Synthesis Process 504 that may optionally employ a Neural Network Training Process 505 using a collection of Training Images 506 to produce an optional Capture Neural Network Model 508. Another process commonly used in lieu of training process 505 is Photogrammetry. If model 508 is created during process 500 depicted in FIG. 5, then model 508 becomes one of the assets in the Ingest Format 510 for the natural content. Annotation Process 507 may optionally be performed to annotate scene-based media with IMS metadata. Exemplary embodiments of the Ingest Format 510 include MPI and MSI.

Figure 6:
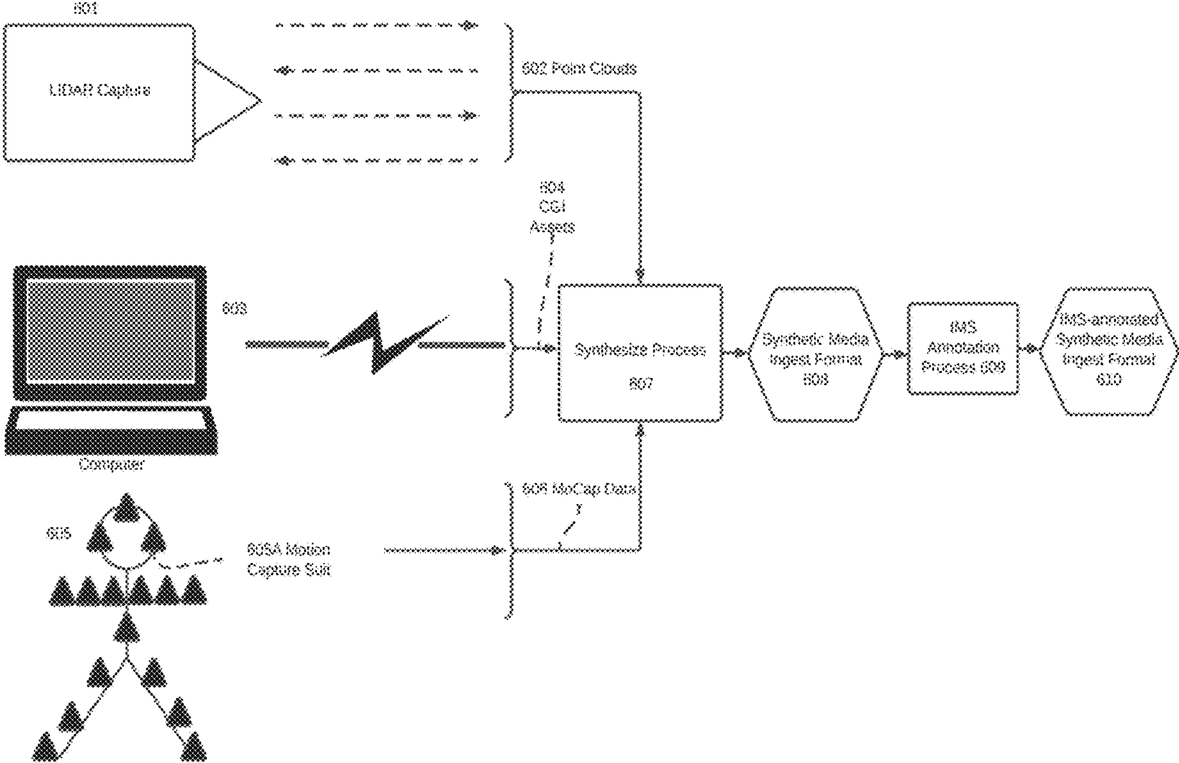
FIG. 6 is a schematic illustration of a process of using 3D modeling tools and formats to create an immersive representation of a synthetic scene that can be used as an ingest format for a network, according to an embodiment.

FIG. 6 illustrates an embodiment of a Synthetic Media Ingest Creation Process 600 to create an ingest format for synthetic media, e.g., computer-generated imagery. LIDAR Camera 601 captures Point Clouds 602 of scene. CGI tools, 3D modelling tools, or another animation processes to create synthetic content are employed on Computer 603 to create 604 CGI Assets over a network. Motion Capture Suit with Sensors 605A is worn on Actor 605 to capture a digital recording of the motion for actor 605 to produce animated MoCap Data 606. Data 602, 604, and 606 are provided as input to Synthesis Process 607 which outputs Synthetic Media Ingest Format 608. Format 608 may then be input into an optional IMS Annotation Process 609 whose output is IMS-annotated Synthetic Media Ingest Format 610.

The techniques for representing and streaming heterogeneous immersive media described above, can be implemented as computer software using computer-readable instructions and physically stored in one or more computer-readable media. For example, FIG. 7 depicts a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
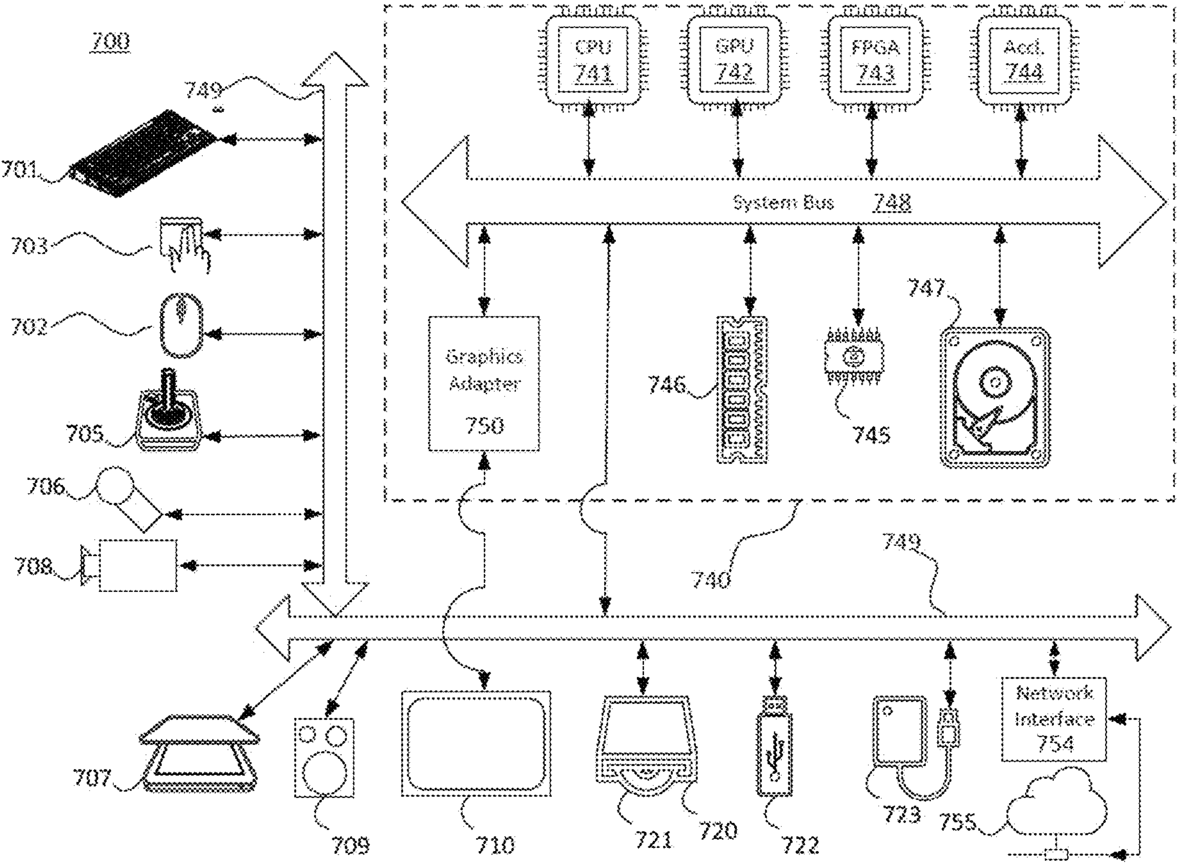
FIG. 7 is a system diagram of computer system, according to an embodiment.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710, data-glove (not depicted), joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove (not depicted), or joystick 705, but there can also be tactile feedback devices that do not serve as input devices), audio output devices (such as: speakers 709, headphones (not depicted)), visual output devices (such as screens 710 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (749) (such as, for example USB ports of the computer system 700; others are commonly integrated into the core of the computer system 700 by attachment to a system bus as described below (for example Ethernet interface into a PC computer system or cellular network interface into a smartphone computer system). Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators for certain tasks 744, and so forth. These devices, along with Read-only memory (ROM) 745, Random-access memory 746, internal mass storage such as internal non-user accessible hard drives, SSDs, and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include PCI, USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also be stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Figure 8:
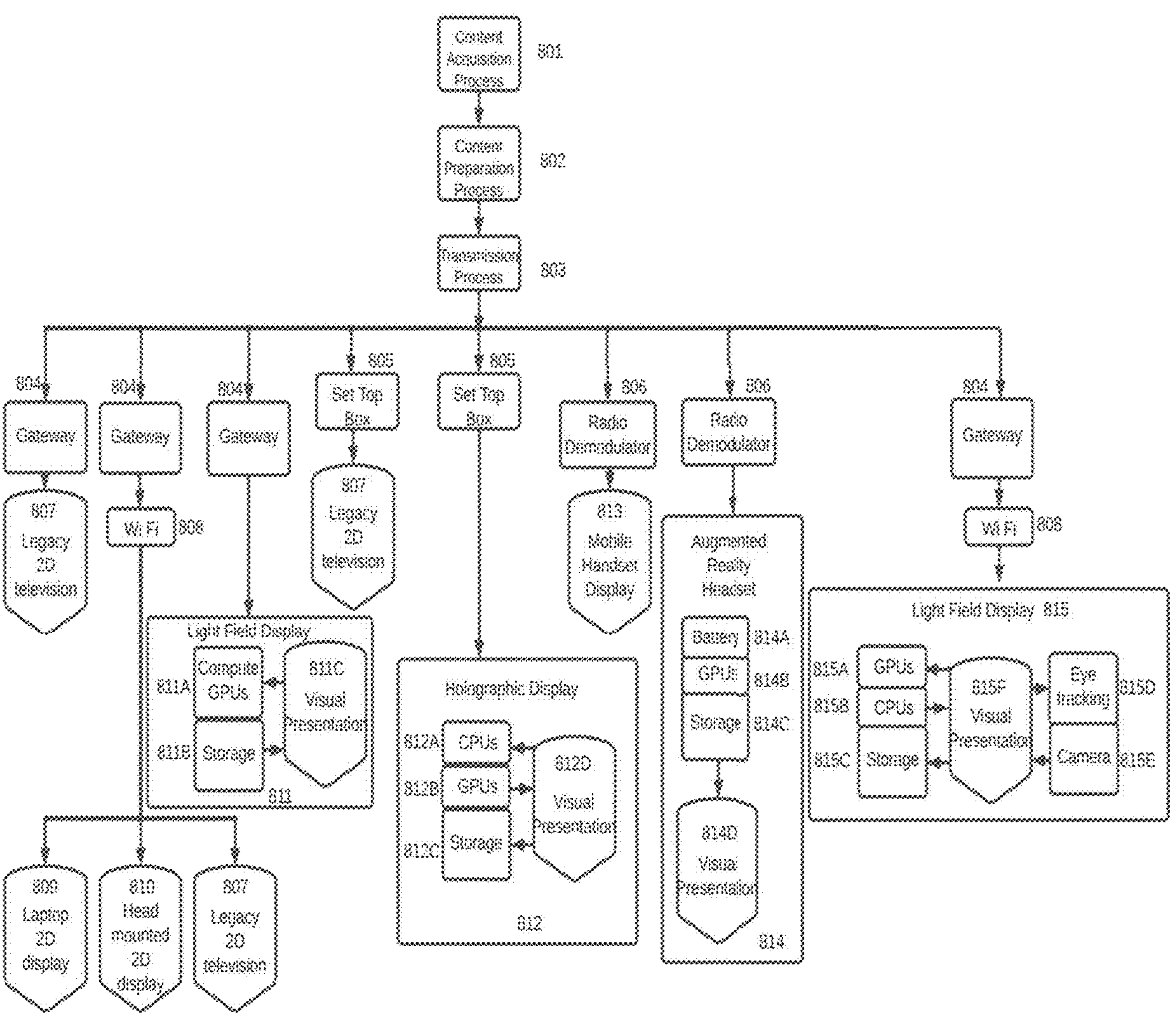
FIG. 8 is a schematic illustration of a network that serves a plurality of heterogenous client end-points.

FIG. 8 illustrates an exemplary Network Media Distribution System 800 that supports a variety of legacy and heterogenous immersive-media capable displays as client end-points. Content Acquisition Process 801 captures or creates the media using example embodiments in FIG. 6 or FIG. 5. Ingest formats are created in Content Preparation Process 802 and then are transmitted to network media distribution system using Transmission Process 803. Gateways 804 may serve customer premise equipment to provide network access to various client end-points for the network. Set Top Boxes 805 may also serve as customer premise equipment to provide access to aggregated content by the network service provider. Radio Demodulators 806 may serve as mobile network access points for mobile devices, e.g. as shown with Mobile Handset and Display 813. In this particular embodiment of system 800, Legacy 2D Televisions 807 are shown to be directly connected to gateways 804 Set Top Box 805, or WiFi Router 808. A computer laptop with a legacy 2D display 809 is illustrated as a client end-point connected to WiFi Router 808. A Head Mounted 2D (raster-based) Display 810 is also connected to router 808. A Lenticular Light Field Display 811 is shown connected to a gateway 804. Display 811 is comprised of local Compute GPUs 811A, Storage Device 811B, and a Visual Presentation Unit 811C that creates multiple views using a ray-based lenticular optical technology. A Holographic Display 812 is shown connected to a set top box 805. Display 812 is comprised of local Compute CPUs 812A, GPUs 812B, Storage Device 812C, and a Fresnal pattern, wave-based holographic Visualization Unit 812D. An Augmented Reality Headset 814 is shown connected to radio demodulator 806. Headset 814 is comprised of GPU 814A, Storage Device 814B, Battery 814C, and volumetric Visual Presentation Component 814D. Dense Light Field Display 815 is shown as connected to a WiFi router 808. The Display 815 is comprised of multiple GPUs 815A, CPUs 815B, Storage Device 815C, Eye Tracking Device 815D, Camera 815E, and a dense ray-based light field panel 815F.

Figure 9:
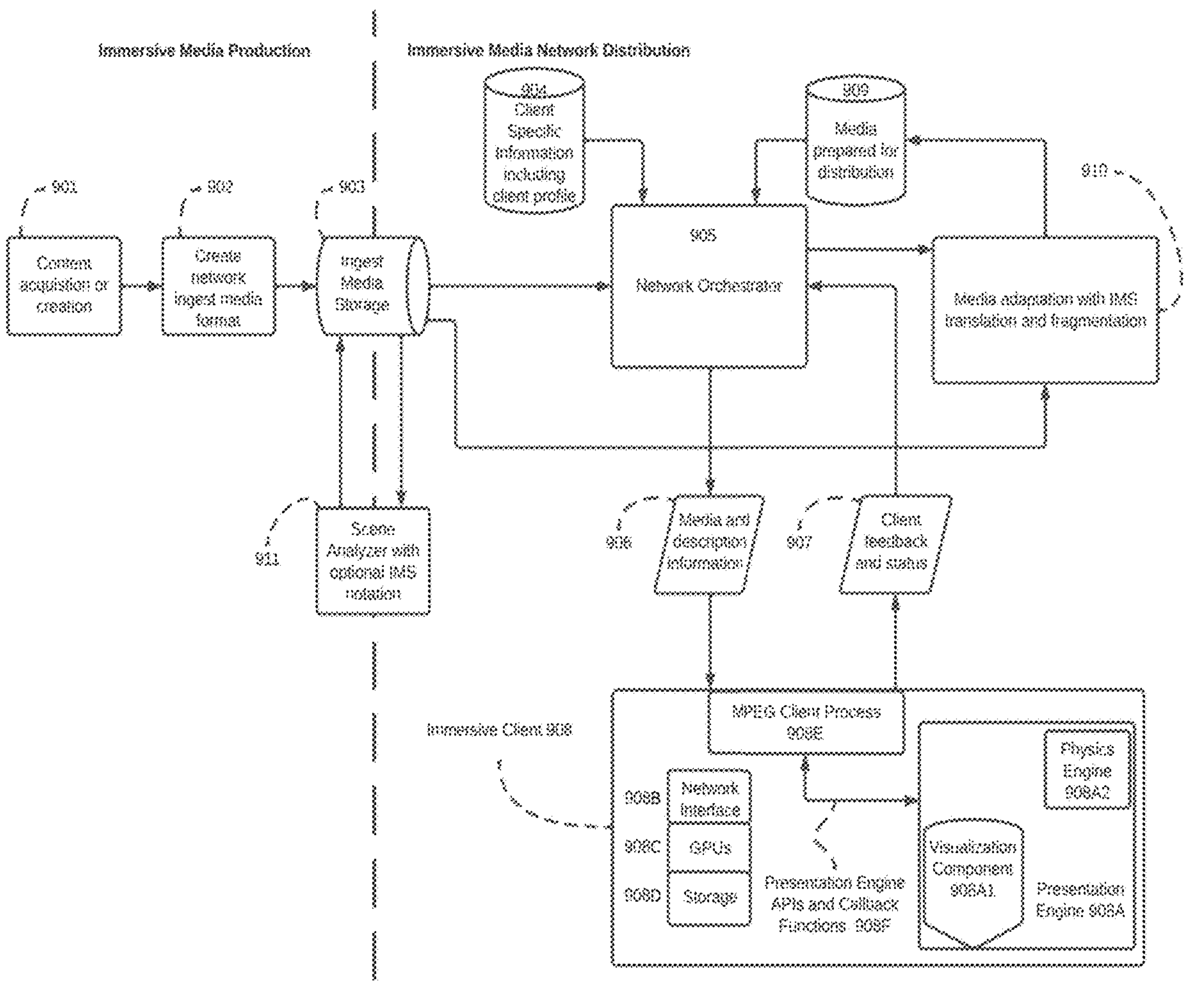
FIG. 9 is a schematic illustration of a network providing adaptation information about the specific media represented in the media ingest format, according to an embodiment.

FIG. 9 illustrates an embodiment of an Immersive Media Distribution with Scene Analyzer for default viewport Process 900 that is capable of serving legacy and heterogenous immersive media-capable displays as previously depicted in FIG. 8. Content is either created or acquired in Process 901, which is further embodied in FIG. 5 and FIG. 6 for natural and CGI content respectively. Content 901 is then converted into an ingest format using the Create Network Ingest Format Process 902. Process 902 is likewise further embodied in FIG. 5 and FIG. 6 for natural and CGI content respectively. The ingest media is optionally annotated with IMS metadata by Scene Analyzer with Optional IMS Notation 911. The ingest media format is transmitted to the network and stored on Storage Device 903. Optionally, the Storage Device may reside in the immersive media content producer's network, and accessed remotely by the Immersive Media Network Distribution Process (not numbered) as depicted by the dashed line that bisects 903. Client and application specific information is optionally available on a remote Storage Device 904, which may optionally exist remotely in an alternate "cloud" network.

As depicted in FIG. 9, a Network Orchestration Process 905 serves as the primary source and sink of information to execute the major tasks of the distribution network. In this particular embodiment, Process 905 may be implemented in unified format with other components of the network. Nevertheless the tasks depicted by Process 905 in FIG. 9 form essential elements of the disclosed subject matter. Orchestration Process 905 may further employ a bi-directional message protocol with the client to facilitate all processing and distribution of the media in accordance with the characteristics of the client. Furthermore, the bi-directional protocol may be implemented across different delivery channels, i.e., a control plane channel and a data plane channel.

Process 905 receives information about the features and attributes of Client 908, and furthermore collects requirements regarding the application currently running on 908. This information may be obtained from Device 904, or in an alternate embodiment, may be obtained by directly querying the client 908. In the case of a direct query to client 908, a bi-directional protocol (not shown in FIG. 9) is assumed to be present and operational so that the client may communicate directly to the Orchestration Process 905.

Figure 10:
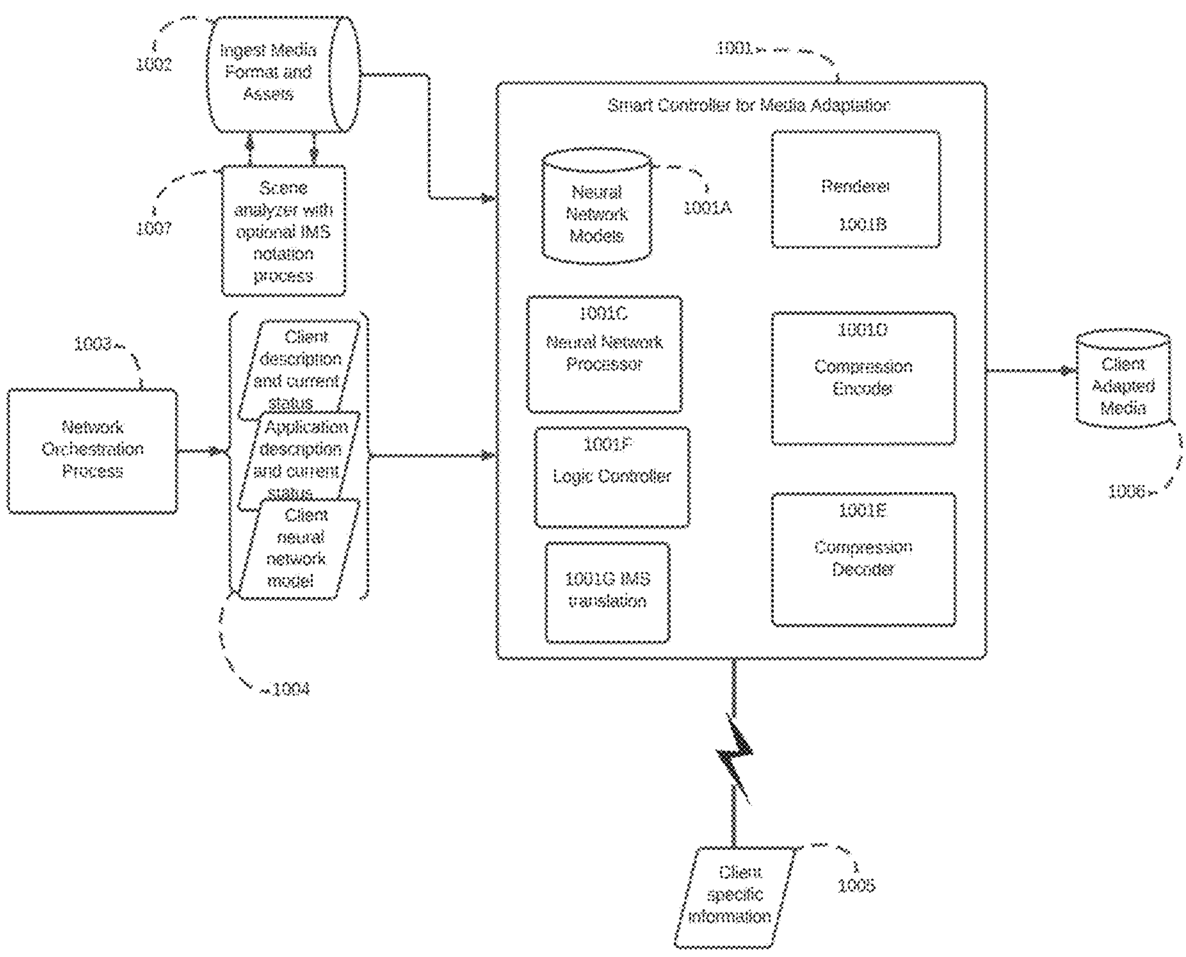
FIG. 10 is a system diagram of a media adaptation process consisting of a media render-converter that converts a source media from its ingest format to a specific format suitable, according to an embodiment.

Orchestration Process 905 also initiates and communicates with Media Adaptation and Fragmentation Process 910 which is described in FIG. 10. As ingest media is adapted and fragmented by Process 910, the media is optionally transferred to an intermedia storage device depicted as the Media Prepared for Distribution Storage Device 909. As the distribution media is prepared and stored in device 909, Orchestration Process 905 ensures that Immersive Client 908, via its Network Interface 908B, either receives the distribution media and corresponding descriptive information 906 either through a "push" request, or Client 908 itself may initiate a "pull" request of the media 906 from Storage Device 909. Orchestration Process 905 may employ a bi-directional message interface (not shown in FIG. 9) to perform the "push" request or to initiate a "pull" request by the Client 908. Immersive Client 908 may optionally employ GPUs (or CPUs not shown) 908C. The Distribution Format of the media is stored in Client 908's Storage Device or Storage Cache 908D. Finally, Client 908 visually presents the media via its Visualization Component 908A.

Throughout the process of streaming the immersive media to Client 908, the Orchestration Process 905 will monitor the status of the Client's progress via Client Progress and Status Feedback Channel 907. The monitoring of status may be performed by means of a bi-directional communication message interface (not shown in FIG. 9).

FIG. 10 depicts a particular embodiment of a Scene Analyzer for Media Adaptation Process 1000 so that the ingested source media may be appropriately adapted to match the requirements of the Client 908. Media Adaptation Process 1001 is comprised of multiple components that facilitate the adaptation of the ingest media into an appropriate distribution format for Client 908. These components should be regarded as exemplary. In FIG. 10, Adaptation Process 1001 receives input Network Status 1005 to track the current traffic load on the network; Client 908 information including Attributes and Features Description, Application Features and Description as well as Application Current Status, and a Client Neural Network Model (if available) to aid in mapping the geometry of the client's frustum to the interpolation capabilities of the ingest immersive media. Such information may be obtained by means of a bi-directional message interface (not shown in FIG. 10). Adaptation Process 1001 ensures that the adapted output, as it is created, is stored into an Client-Adapted Media Storage Device 1006. Scene Analyzer with Optional IMS Notation Process 1007 is depicted in FIG. 10 as an optional process that may be executed a prioi or as part of the network automated process for the distribution of the media.

Adaptation Process 1001 is controlled by Logic Controller 1001F. Adaptation Process 1001 also employs a Renderer 1001B or a Neural Network Processor 1001C to adapt the specific ingest source media to a format that is suitable for the client. Neural Network Processor 1001C uses Neural Network Models in 1001A. Examples of such a Neural Network Processor 1001C include the Deepview neural network model generator as described in MPI and MSI. If the media is in a 2D format, but the client must have a 3D format, then the Neural Network Processor 1001C can invoke a process to use highly correlated images from a 2D video signal to derive a volumetric representation of the scene depicted in the video. An example of a suitable Renderer 1001B could be a modified version of the OTOY Octane renderer (not shown) which would be modified to interact directly with the Adaptation Process 1001. Adaptation Process 1001 may optionally employ Media Compressors 1001D and Media Decompressors 1001E depending on the need for these tools with respect to the format of the ingest media and the format required by Client 908.

Figure 11:
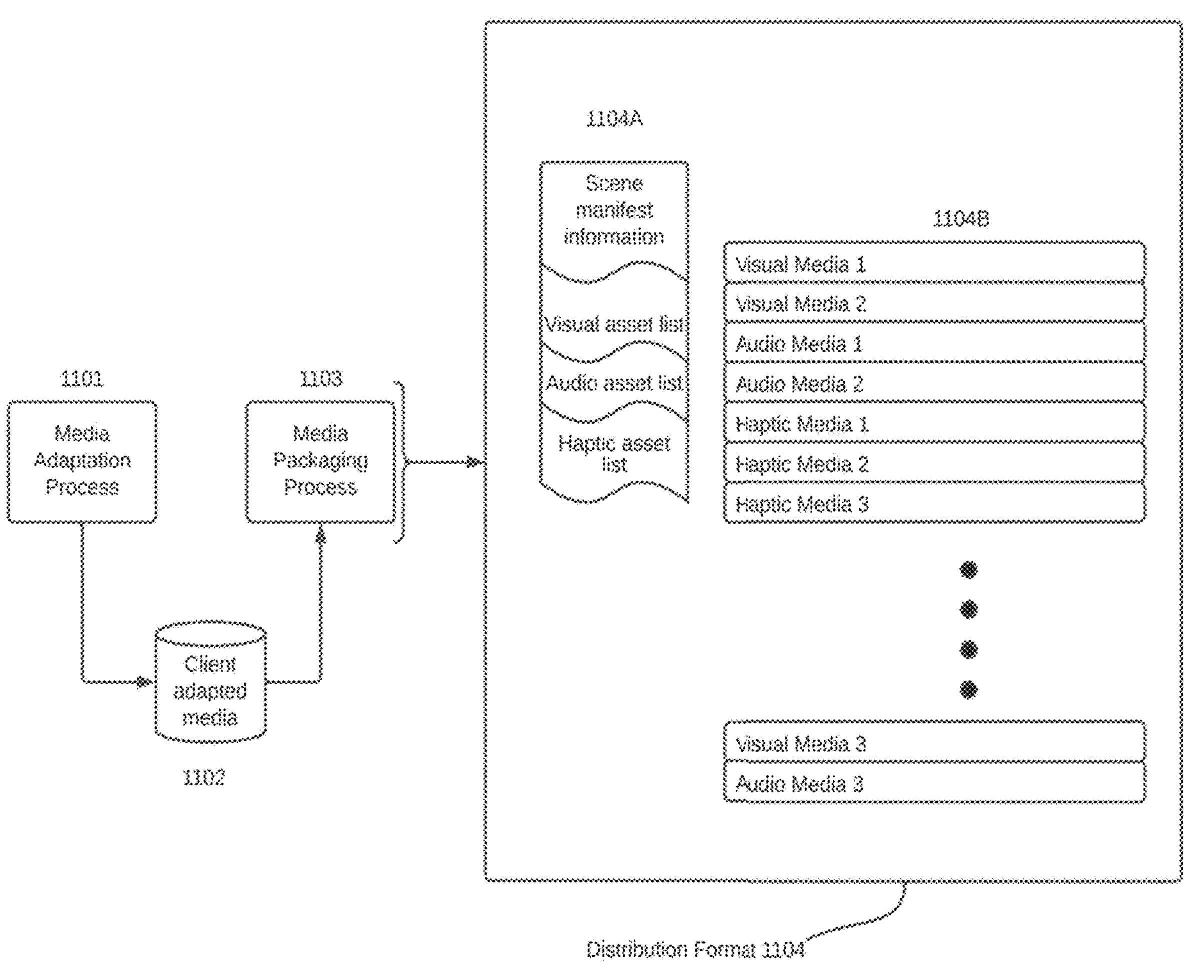
FIG. 11 is a schematic illustration of a network formatting the adapted source media into a data model suitable for representation and streaming, according to an embodiment.

FIG. 11 depicts a Distribution Format Creation Process 1100. Adapted Media Packaging Process 1103 packages media from Media Adaptation Process 1101 (depicted as Process 1000 in FIG. 10) now residing on Client Adapted Media Storage Device 1102. The Packaging Process 1103 formats the Adapted Media from Process 1101 into a robust Distribution Format 1104, for example, the exemplary formats shown in FIG. 3 or FIG. 4. Manifest Information 1104A provides Client 908 with a List of Scene Data Assets 1104B that it can expect to receive. List 1104B depicts a list of Visual Assets, Audio Assets, and Haptic Assets, each with their corresponding metadata.

Figure 12:
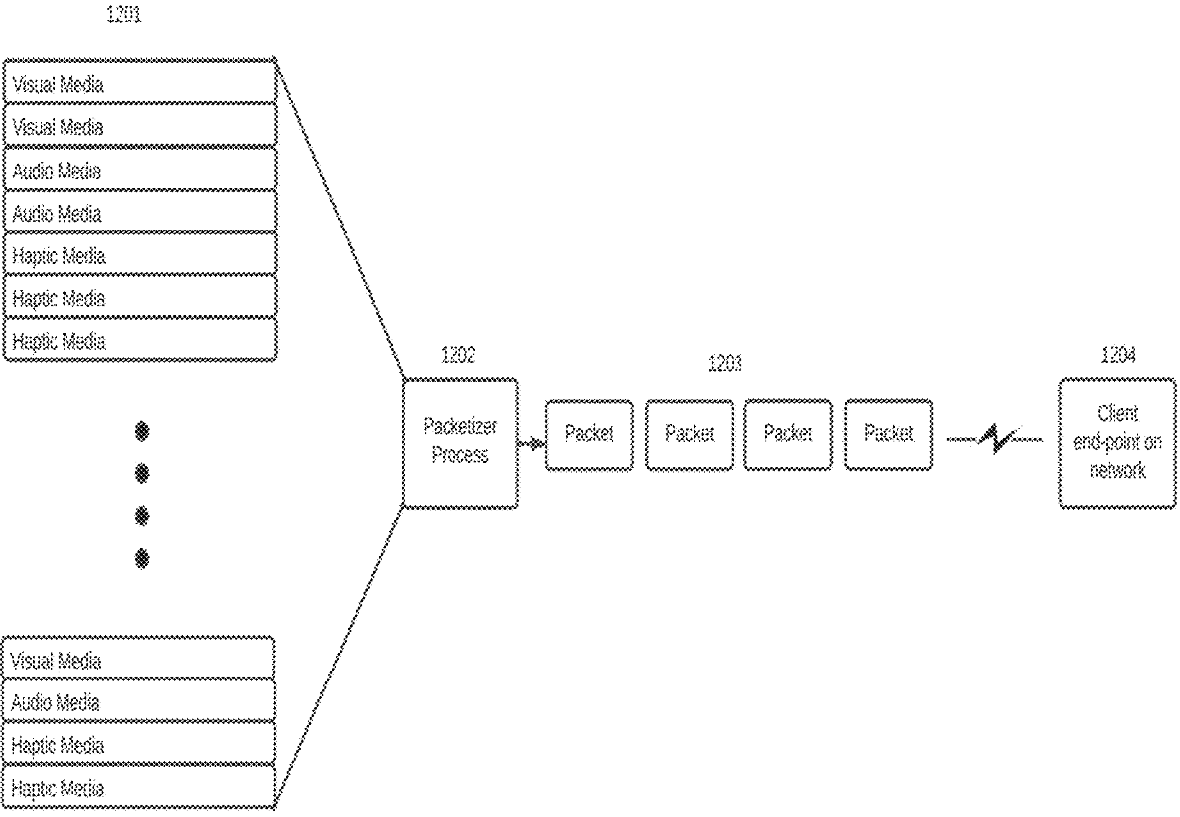
FIG. 12 is a system diagram of a media streaming process that fragments the data model into the payloads of network protocol packets, according to an embodiment.

FIG. 12 depicts a Packetizer Process System 1200. Packetizer Process 1202 separates the adapted media 1201 into individual Packets 1203 suitable for streaming to Client 908.

Figure 13:
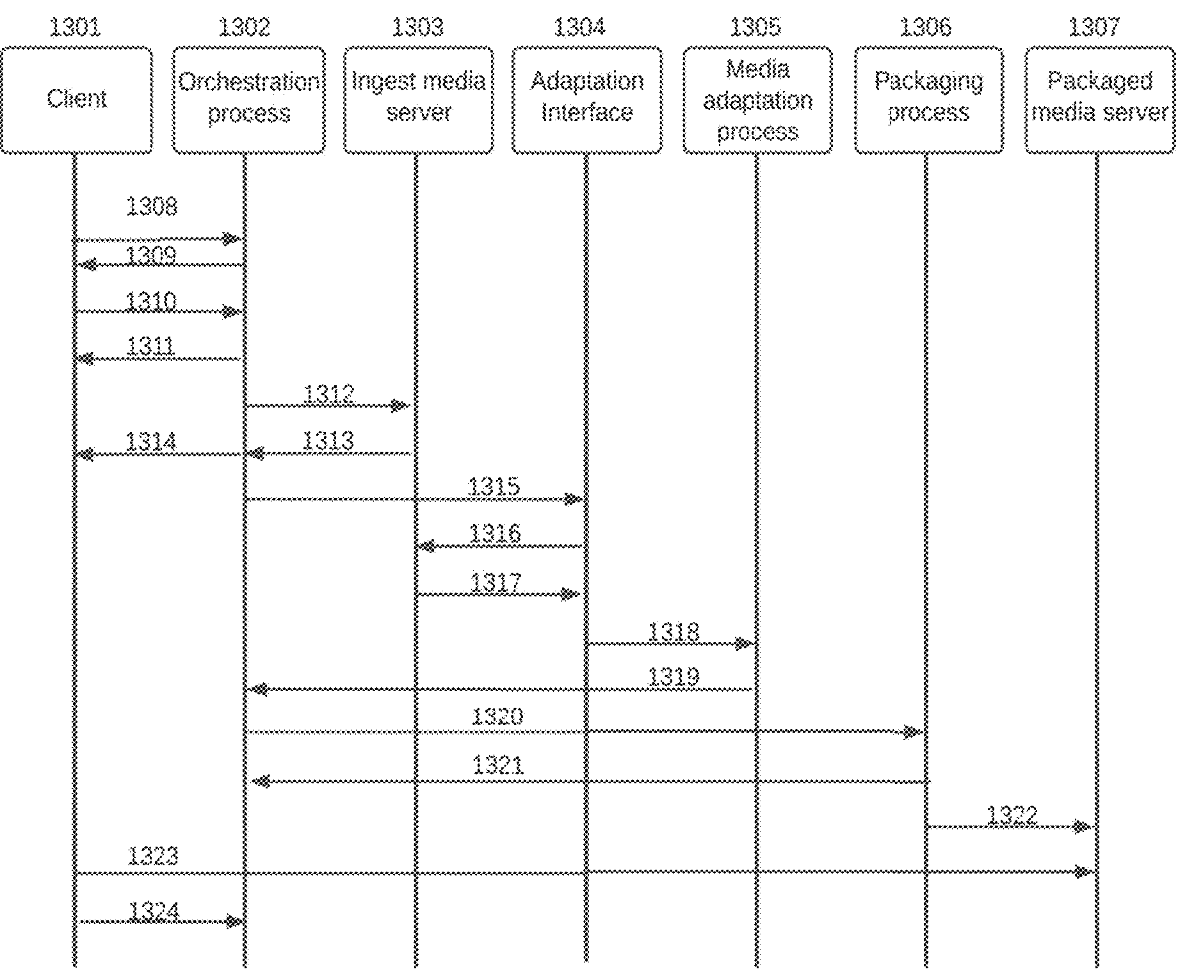
FIG. 13 is a sequence diagram of a network adapting a specific immersive media in an ingest format to a streamable and suitable distribution format for a specific immersive media client end-point, according to an embodiment.

The components and communications shown in FIG. 13 for Sequence Diagram 1300 are explained as follows: Client end-point 1301 initiates a Media Request 1308 to Network Distribution Interface or orchestration process 1302. The request 1308 includes information to identify the media that is requested by the client, either by URN or other standard nomenclature. The Network Distribution Interface (also known as Client 1301) responds to request 1308 with Profiles Request 1309, which requests that client 1301 provide information about its currently available resources (including compute, storage, percent battery charged, and other information to characterize the current operating status of the client). Profiles Request 1309 also requests that the client provide one or more neural network models that can be used by the network for neural network inferencing to extract or interpolate the correct media views to match the features of the client's presentation system, if such models are available at the client. Response 1311 from client 1301 to Network Distribution Interface 1302 provides a client token, application token, and one or more neural network model tokens (if such neural network model tokens are available at the client). The Network Distribution Interface 1302 then provides client 1301 with a Session ID token 1311. Network Distribution Interface 1302 then requests Ingest Media Server 1303 with Ingest Media Request 1312, which includes the URN or other standard name for the media identified in request 1308. Ingest Media Server 1303 replies to request 1312 with response 1313 which includes an ingest media token. Network Distribution Interface 1302 then provides the media token from response 1313 in a call 1314 to client 1301. Network Distribution Interface 1302 then initiates the adaptation process for the requested media in 1308 by providing the Adaptation Interface 1304 with the ingest media token, client token, application token, and neural network model tokens. Adaptation Interface 1304 requests access to the ingest media by providing Ingest Media Server 1303 with the ingest media token at call 1316 to request access to the ingest media assets. Ingest Media Server 1303 responds to request 1316 with an ingest media access token in response 1317 to Adaptation Interface 1304. Adaptation Interface 1304 then requests that Media Adaptation Process 1305 adapt the ingest media located at the ingest media access token for the client, application, and neural network inference models corresponding to the session ID token created at 1313. Request 1318 from Adaptation Interface 1304 to Media Adaptation Process 1305 contains the required tokens and session ID. Media Adaptation Process 1305 provides Network Distribution Interface 1302 with adapted media access token and session ID in update 1319. Network Distribution Interface 1302 provides Packaging Process 1306 with adapted media access token and session ID in interface call 1320. Packaging process 1306 provides response 1321 to Network Distribution Interface 1302 with the Packaged Media Access Token and Session ID in response 1321. Packaging Process 1306 provides packaged assets, URNs, and the Packaged Media Access Token for the Session ID to the Packaged Media Server 1307 in response 1322. Client 1301 executes Request 1323 to initiate the streaming of media assets corresponding to the Packaged Media Access Token received in message 1321. The client 1301 executes other requests and provides status updates in message 1324 to the Network Distribution Interface 1302.

Figure 14:
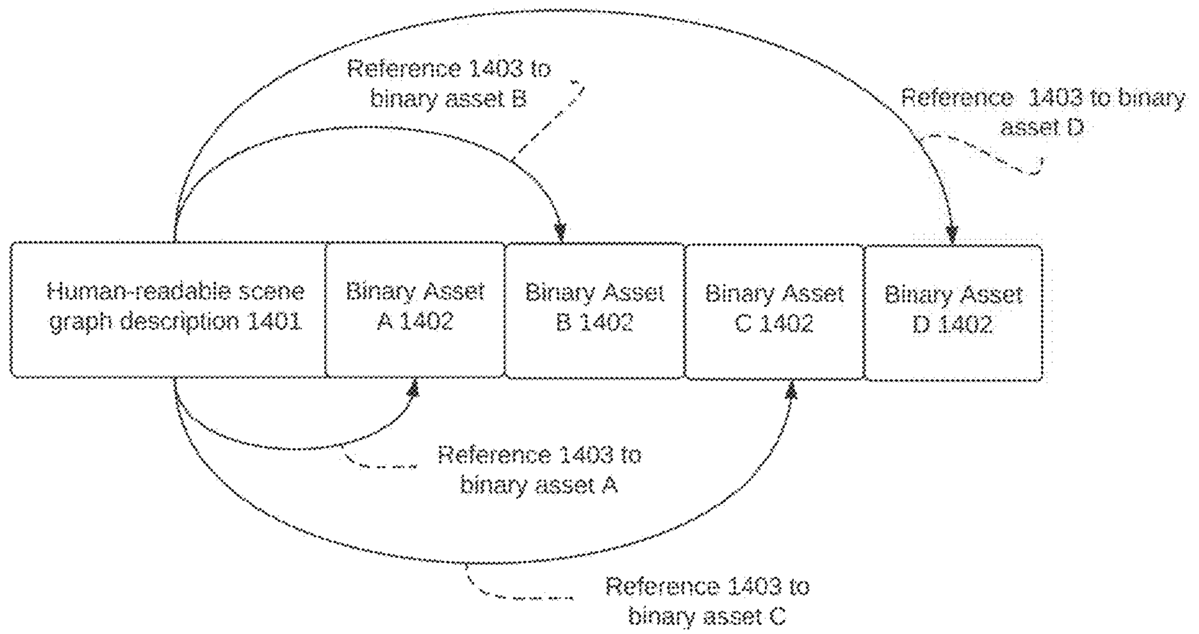
FIG. 14 depicts an exemplary architecture for scene graphs.

FIG. 14 depicts an exemplary scene graph architecture 1400. Human-readable scene graph description 1401 serves as the portion of the scene graph where spatial, logical, physical, and temporal aspects of the attached assets are stored. Description 1401 also contains references to binary assets that further comprise the scene. Associated with the Description 1401 are Binary Assets 1402. FIG. 14 illustrates that there are four binary assets for the exemplary graph including: Binary Asset A 1402, Binary Asset B 1402, Binary Asset C 1402, and Binary Asset D 1402. References 1403 from Description 1401 are also illustrated as: Reference 1403 to Binary Asset A, Reference 1403 to Binary Asset B, Reference 1403 to Binary Asset C, and Reference 1403 to Binary Asset D.

FIG. 15 depicts an expanded example 1500 of the general scene graph architecture 1400 depicted in FIG. 14 using the human-readable portion of a glTF scene graph. The example 1504 of human-readable scene graph description 1501 illustrates the syntax of the glTF specification. Description 1501 serves as the portion of the scene graph where spatial, logical, physical, and temporal aspects of the associated assets are stored. Description 1501 shown in FIG. 15 also contains references to binary assets that further comprise the scene; note that these binary asset illustrations are not depicted in 1504. Associated with the Description 1501 are Binary Assets 1502. FIG. 15 illustrates that there are four binary assets for the exemplary graph including: Binary Asset A 1502, Binary Asset B 1502, Binary Asset C 1502, and Binary Asset D 1502. References 1503 from Description 1501 are also illustrated as: Reference 1503 to Binary Asset A, Reference 1503 to Binary Asset B, Reference 1503 to Binary Asset C, and Reference 1503 to Binary Asset D.

Figure 16:
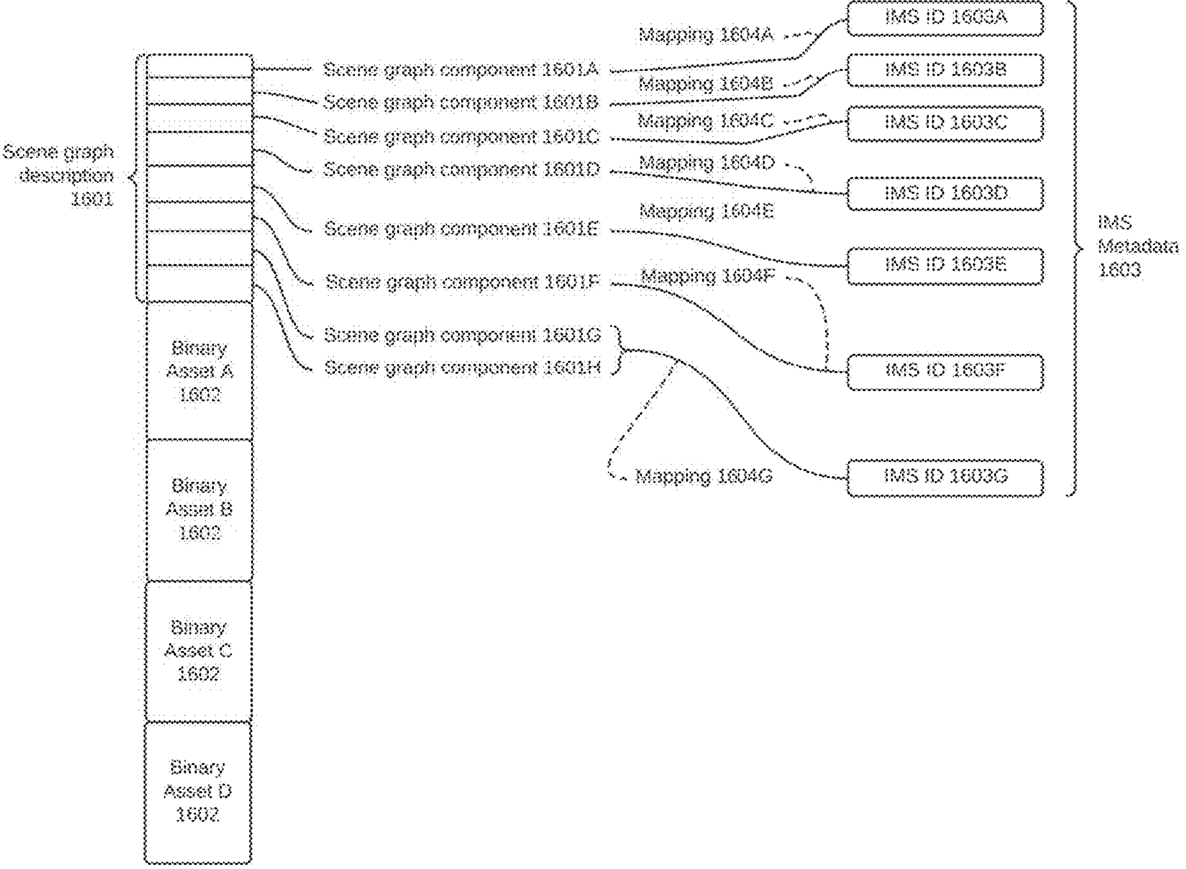
FIG. 16 depicts an example of a scene graph that is annotated, according to an embodiment.

FIG. 16 provides an exemplary scene graph architecture that is annotated with IMS metadata to create IMS-Annotated Scene Graph Architecture 1600. The structure and organization of Scene Graph Architecture 1600 is very similar to Scene Graph Architecture 1400 in FIG. 14. Human-readable Scene Graph Description 1601 is comprised of several components, each one responsible for describing some part of the physical, logical, spatial, or temporal aspects of the associated Binary Assets 1602. Binary Assets for Architecture 1600 include: Binary Asset A 1602, Binary Asset B 1602, Binary Asset C 1602, and Binary Asset D 1602. Description 1601 includes components: Scene Graph Component 1601A, Scene Graph Component 1601B, Scene Graph Component 1601C, Scene Graph Component 1601D, Scene Graph Component 1601E, Scene Graph Component 1601F, Scene Graph Component 1601G, and Scene Graph Component 1601H. Annotations of Scene Graph Components 1601 with IMS Metadata 1603 are illustrated with Mappings 1604. In FIG. 16, Mapping 1604A logically links Scene Graph Component 1601A with IMS Metadata ID 1603A; Mapping 1604B logically links Scene Graph Component 1601B with IMS Metadata ID 1603B; Mapping 1604C logically links Scene Graph Component 1601C with IMS Metadata ID 1603C; Mapping 1604D logically links Scene Graph Component 1601D with IMS Metadata ID 1603D; Mapping 1604E logically links Scene Graph Component 1601E with IMS Metadata ID 1603E; Mapping 1604F logically links Scene Graph Component 1601F with IMS Metadata ID 1603F; and Mapping 1604G logically links both Scene Graph Components 1601G and 1601H with IMS Metadata ID 1603G.

Figure 17:
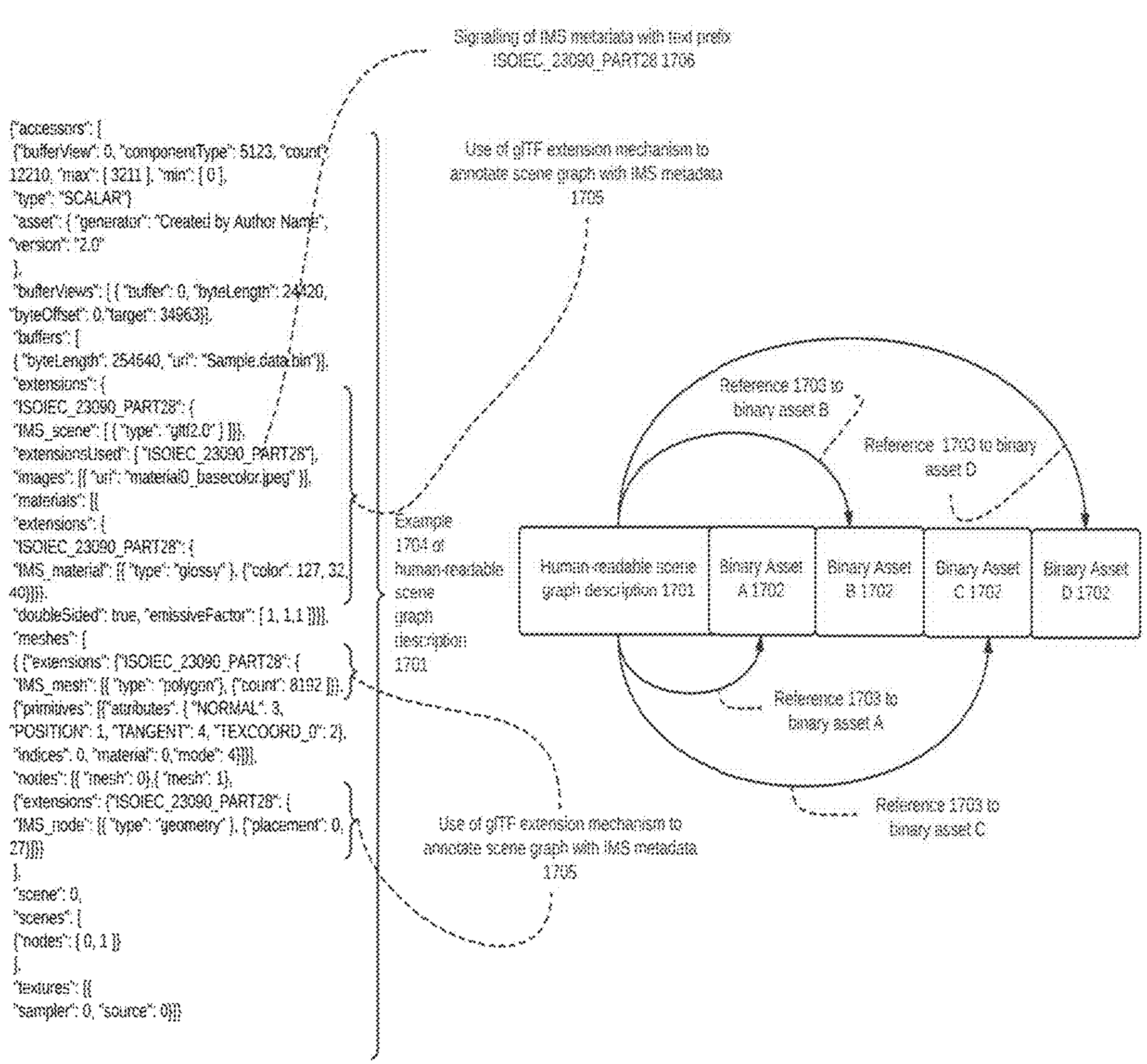
FIG. 17 depicts an example of a scene graph that is annotated, according to an embodiment.

FIG. 17 provides an example architecture 1700 of utilizing the extension features of the base glTF specification to annotate the human-readable scene graph description of the glTF with IMS metadata directly embedded inline as human-readable metadata. The human-readable description is depicted as 1701 in the scene graph architecture of FIG. 17. The annotated example of description 1701 is expanded and depicted as 1704 in FIG. 17. Note that description 1701 in FIG. 17 is an annotated version of the human-readable description 1501 from FIG. 15. Example 1705 depicts standardized IMS metadata embedded directly inline the human-readable description. Example 1706 illustrates a signalling of the IMS metadata using textual prefix "ISOIEC 23090 PART28." Associated with the Description 1701 are Binary Assets 1702. FIG. 17 illustrates that there are four binary assets for the exemplary graph including: Binary Asset A 1702, Binary Asset B 1702, Binary Asset C 1702, and Binary Asset D 1702. References 1703 from Description 1701 are also illustrated as: Reference 1703 to Binary Asset A, Reference 1703 to Binary Asset B, Reference 1703 to Binary Asset C, and Reference 1703 to Binary Asset D.

Figure 18:
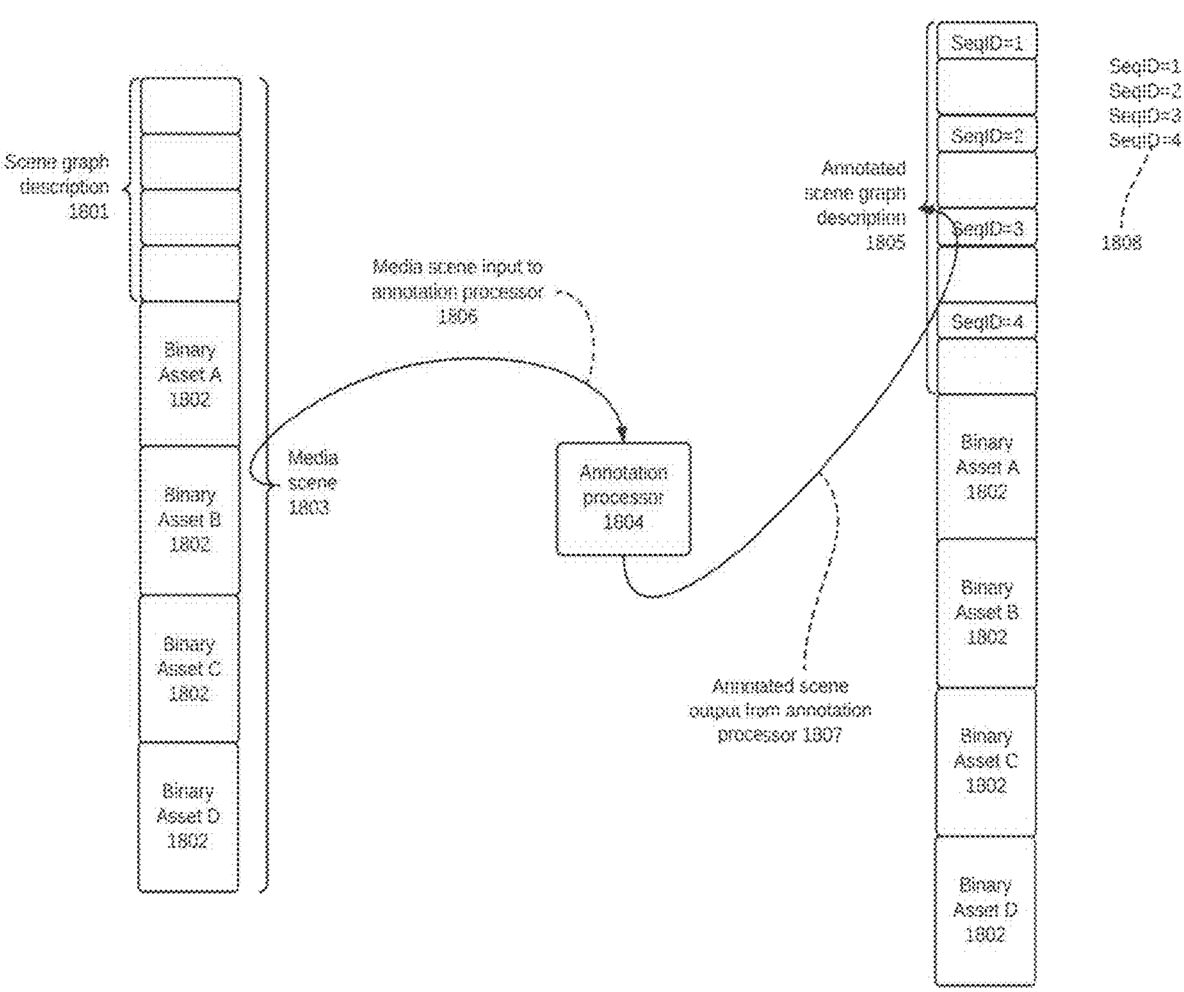
FIG. 18 depicts a workflow where a scene graph is annotated by an annotation processor, according to an embodiment.

FIG. 18 provides a workflow 1800 where a media scene is annotated by an IMS annotation processor with sequence IDs. Media Scene 1803 comprised of Scene Graph Description 1801, Binary Asset A 1802, Binary Asset B 1802, Binary Asset C 1802, and Binary Asset D 1802 is Input 1806 to Annotation Processor 1804. Annotation Processor 1804 creates metadata for Scene 1803 (not depicted in workflow 1800) and corresponding Sequence Identifiers 1808 that are stored in the Annotated Scene Description 1805. Annotated Scene Description 1805 is Output 1807 from Processor 1804.

Figure 19:
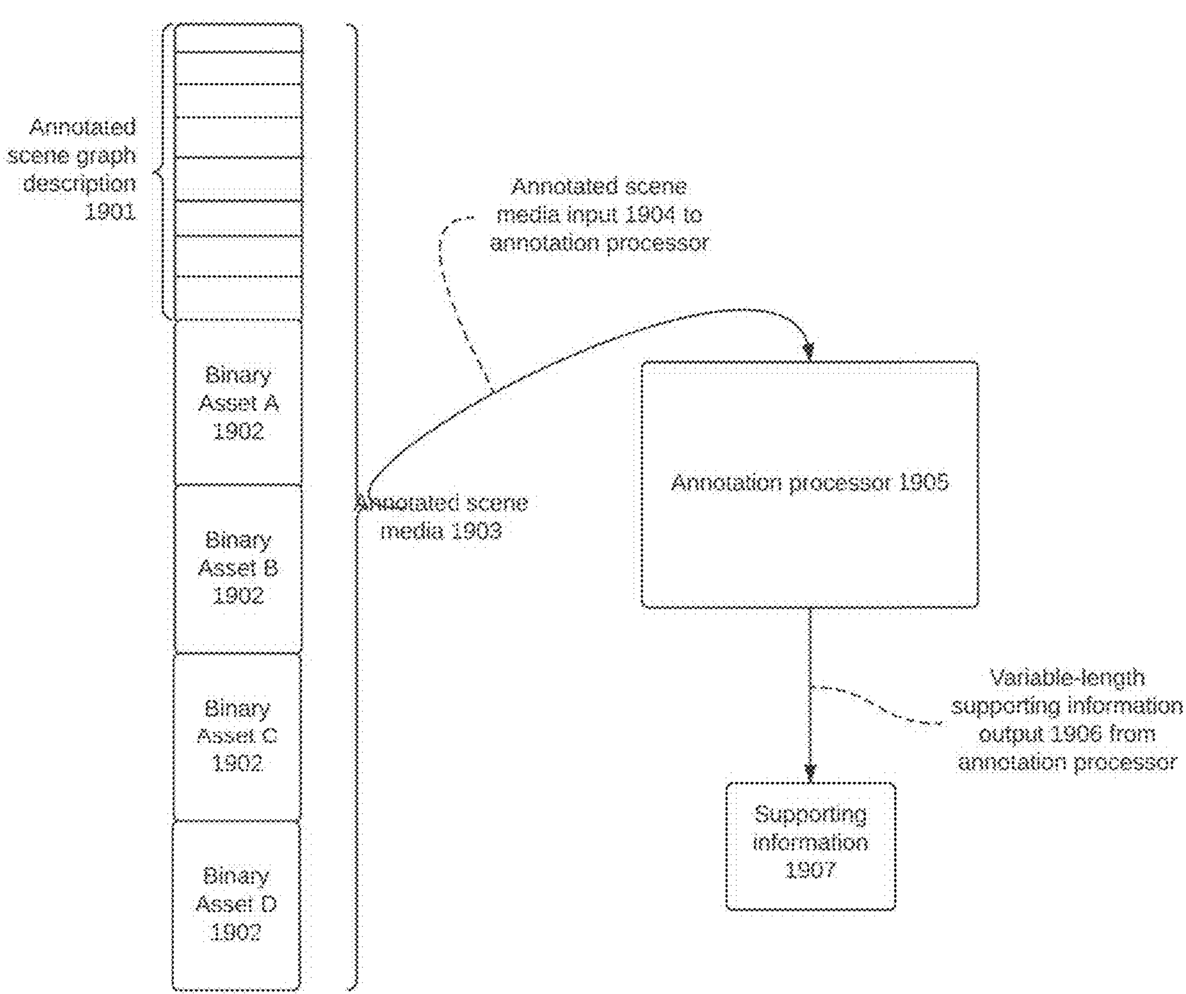
FIG. 19 depicts an annotation processor logic workflow in which the annotation processor creates supporting information to facilitate access and interpretation of IMS metadata for an annotated scene or portion of a scene, according to an embodiment.

FIG. 19 Provides a workflow 1900 where Annotated Scene Media 1903 comprised of Annotated Scene Graph Description 1901, Binary Asset A 1902, Binary Asset B 1902, Binary Asset C 1902, and Binary Asset D 1902 is Input 1904 to Annotation Processor 1905. Annotation Processor 1905 creates a variable-length supporting information for the Media 1903 (not depicted in workflow 1900). In this embodiment, variable-length supporting information 1907 is Output 1906 from Processor 1905. In some embodiments, Annotation Processor 1905 creates a fixed-length checksum for the Media 1903 (not depicted in workflow 1900). In this embodiment, fixed-length checksum 1907 is Output 1906 from Processor 1905.

Figure 20:
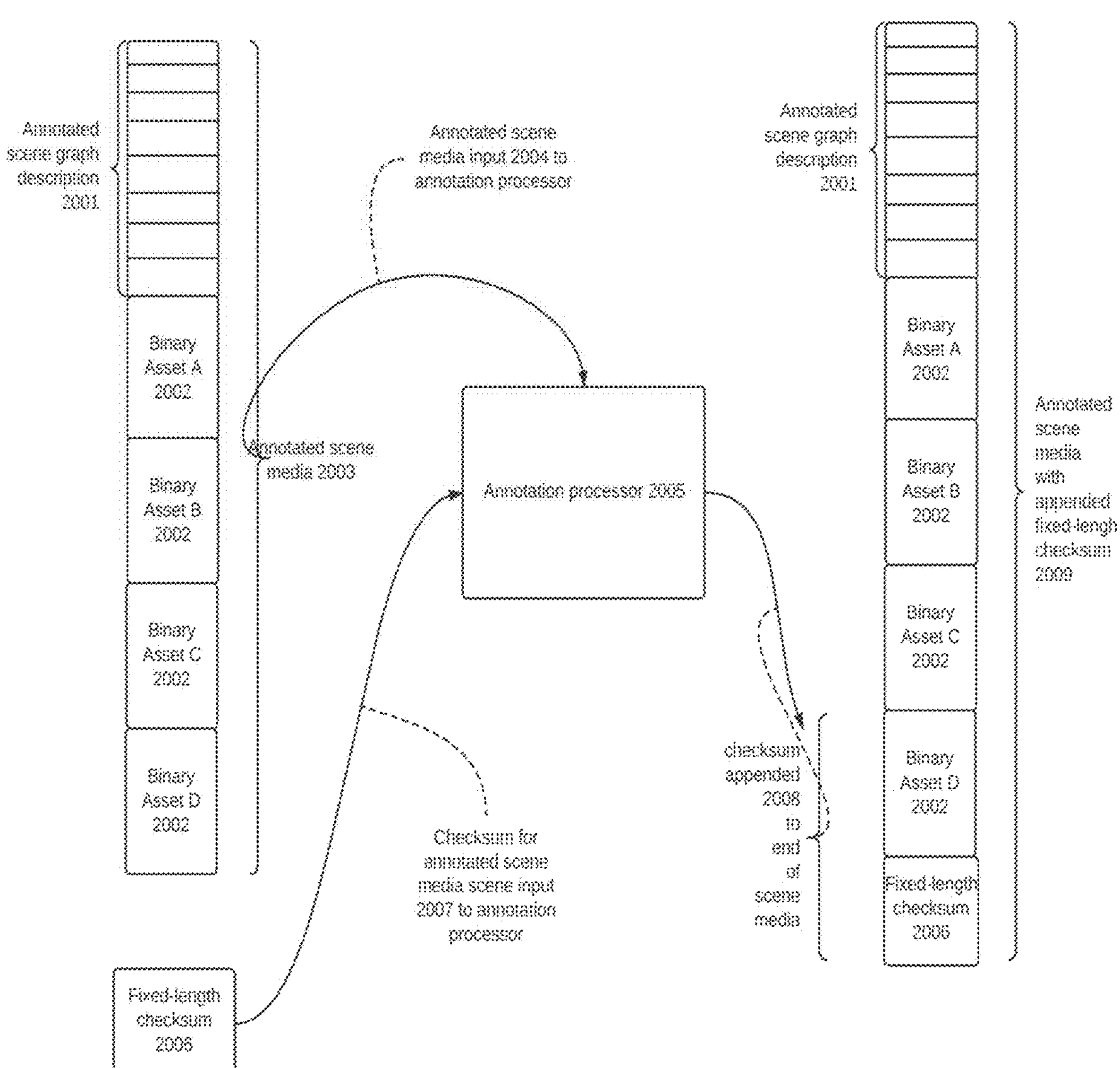
FIG. 20 depicts a workflow in which an annotation processor appends a fixed-length checksum to scene media, according to an embodiment.

FIG. 20. depicts a workflow 2000 where an annotation processor 2005 appends a fixed-length checksum to annotated scene media. Annotated Scene Media 2003 comprised of Annotated Scene Graph Description 2001, Binary Asset A 2002, Binary Asset B 2002, Binary Asset C 2002, and Binary Asset D 2002 is a first Input 2004 to Annotation Processor 2005. Fixed-length Checksum 2006 is a second Input 2007 to Annotation Processor 2005. Processor 2005 appends Checksum 2006 to Media 2003 to Output 2008 Annotated Scene Media with appended fixed-length checksum 2009.

Figure 21:
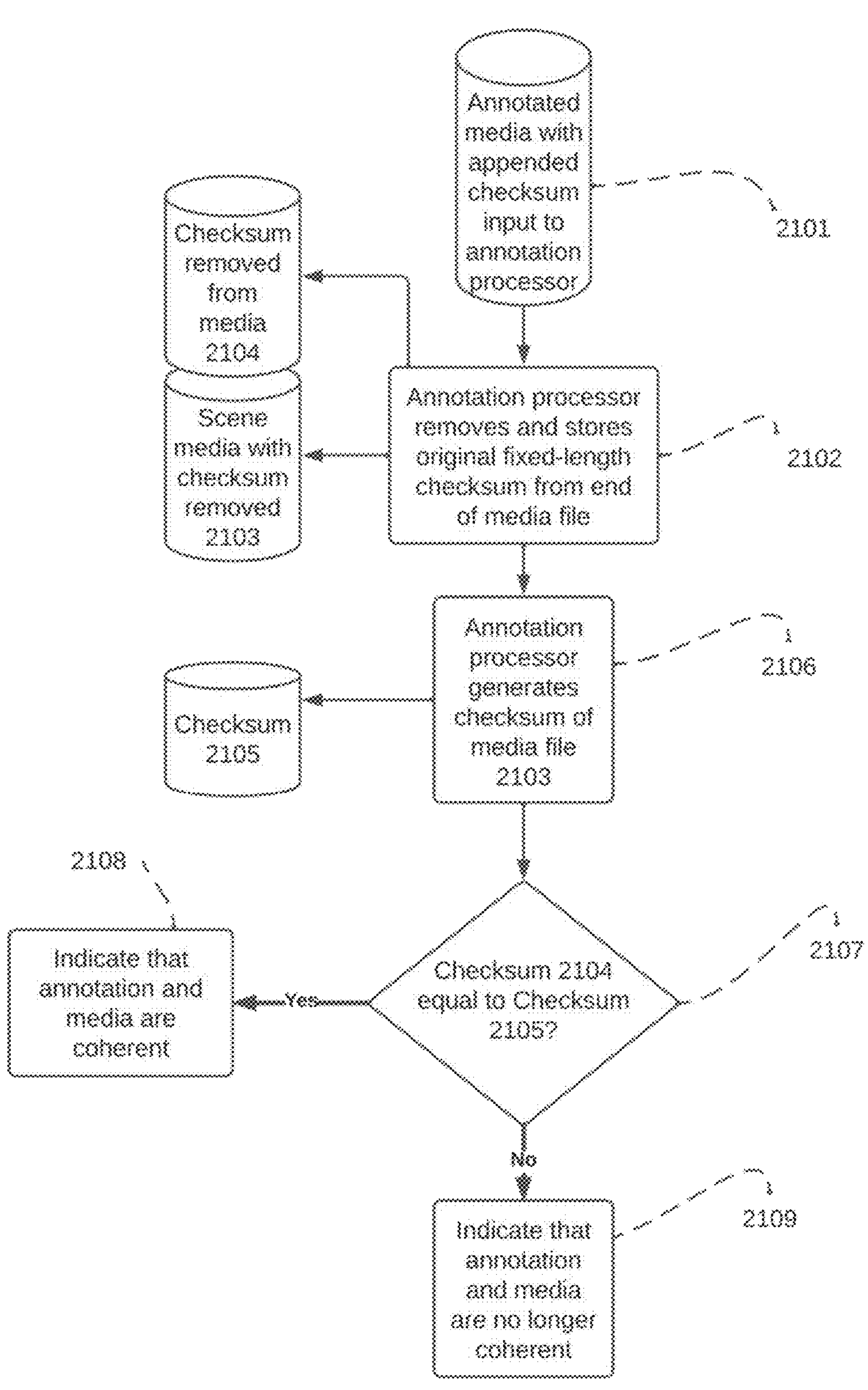
FIG. 21 depicts a workflow where the annotation processor logic prepends the supporting information to the scene media, according to an embodiment.

FIG. 21 depicts a decision-making workflow 2100 where Annotated Media with Appended Checksum is Input 2101 to Annotation Processor. The annotation processor removes and stores 2102 the original fixed-length checksum that is appended to Input 2101 to create Scene Media with Checksum Removed 2103 and Checksum Removed from Media 2104 ("checksum 2104"). Annotation processor generates 2106 checksum of media file 2103 to create Checksum 2105. Annotation processor compares Checksum 2104 to Checksum 2105. If Checksum 2104 is equal to Checksum 2105 then the annotation processor will indicate that the media and the annotation are still coherent 2108. If Checksum 2104 is not equal to Checksum 2105 then the annotation processor will indicate that the media and the annotation are no longer coherent 2109.

FIGS. 22A-22C depict examples of variable length supporting information for IMS metadata and the annotated scene media. In FIG. 22A, such supporting information includes the version of the IMS corresponding to the publication of ISO/IEC 23090 Part 28. In FIG. 22B, such supporting information includes the version of the IMS corresponding to the publication of ISO/IEC 23090 Part 28 and a list of IMS systems that are used throughout the annotated scene media. In FIG. 22C, such supporting information includes the version of the IMS corresponding to the publication of ISO/IEC 23090 Part 28, a list of IMS systems that are used throughout the annotated scene media, and a mapping of the file byte offsets for where IMS metadata is stored along with a corresponding sequence identifier for the IMS metadata.

An embodiment of present disclosure provided herein describes a method, device, system, and a non-transitory computer readable medium to determine, whether a set of metadata used to annotate a particular media or media portion in the immersive media stream is coherent with the media or media portion that the set of metadata describes.

As an example, a method may be provided that includes receiving, by a first processor, an immersive media in an immersive media bitstream, and determining, by the first processor, based on a predefined criteria, whether a set of metadata used to annotate a particular media or media portion in the immersive media stream is coherent with the media or media portion that the set of metadata describes.

The method may also include in response to determining a change has been made to the immersive media in the immersive media bitstream, generating an indicator specifying that the set of metadata and the immersive media in the immersive media bitstream are no longer aligned.

The change may include a modification to a texture of a tree described by the immersive media stream comprising a scene-based media, and the modification to the texture of the tree may cause a change in how the immersive media associated with the immersive media stream is rendered.

The method may also include processing the set of metadata by a second processor that is different from the first processor to translate the immersive media from a first format to a second format.

The method may include storing supporting information in addition to the set of metadata to describe a portion of scene media, wherein the supporting information provides a general description of the scene media without an interpretation process to access and interpret the set of metadata and scene media.

In embodiments, a summary of the type of the immersive media being annotated may be ascertainable without the interpretation process examining the immersive media or the portion of the scene media according to the method.

The method may also include updating or augmenting the set of metadata for the scene media based on a previous annotation of the particular media or media portion.

The method may include the set of metadata comprised of the metadata specified in ISO/IEC 28090 Part 28.

The method may include annotating the particular media or media portion using the set of metadata to facilitate subsequent access and interpretation of the set of metadata by a second processor that is different from the first processor.

An embodiment of present disclosure provided herein describes a method, device, system, and a non-transitory computer readable medium for facilitating interpretation and access of a set of metadata for scene media in a received immersive media bitstream.

The set of metadata include a plurality of IMS Systems identifiers.

The method may also include identifying a version of the set of metadata. Another or same embodiment may include identifying a file byte offset indicating a location where the set of metadata has been physically stored in the file associated with the immersive media bitstream. The method may also include listing the plurality of IMS Systems identifiers that are stored within the scene media in the immersive media bitstream.

An embodiment of present disclosure provided herein describes a method, device, system, and a non-transitory computer readable medium for augmenting a set of metadata while preserving integrity of the set of metadata without replacing the set of metadata partially or entirely.

The method may include identifying characteristics of the set of metadata that are recorded as supporting information to facilitate a subsequent update of the set of metadata.

The method may also include identifying a largest IMS sequence identifier used in annotation of the set of metadata.

The method may also include inserting a plurality of sequence identifiers during an annotation process. In embodiments, the method may include inserting a plurality of sequence identifiers during an annotation update process.

The method may also include identifying a largest IMS sequence identifier used in annotation of the set of metadata; and providing a file offset location of corresponding asset information for each IMS sequence identifier.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for processing annotations in an immersive media stream, the method being executed by at least one processor, and the method comprising:

determining, by the first processor, whether a set of metadata associated with a portion of the received immersive media stream is coherent with the portion of the received immersive media stream based on predefined criteria;

generating, by the first processor, an alignment indicator based on determining that the set of metadata associated with the portion of the received immersive media stream is incoherent;

annotating, by the first processor, the portion of the received immersive media stream to facilitate subsequent access and interpretation of the set of metadata by a second processor that is different from the first processor; and storing, by the first processor, supporting information in addition to the set of metadata, wherein the supporting information describes the portion of the received immersive media stream such that an interpretation process is not needed to access and interpret the set of metadata and the portion of the received immersive media stream.

2. The method of claim 1, wherein the determining that the set of metadata associated with the portion of the received immersive media stream is incoherent comprises:

determining that a texture of a tree described by the portion of the received immersive media stream was modified, wherein the modification to the texture of the tree causes a change in how the portion of the received immersive media stream is rendered.

3. The method of claim 1, further comprising:

translating, by the second processor that is different from the first processor, the portion of the received immersive media stream from a first format into a second format.

4. The method of claim 1, further comprising:

updating, by the first processor or the second processor, the set of metadata for the portion of the received immersive media stream based on a previous annotation of the portion of the received immersive media stream.

5. The method of claim 1, wherein the set of metadata comprising metadata parameters specified in International Organization for Standardization/International Electrotechnical Commission (ISO/IEC) 28090 Part 28.

6. The method of claim 1, wherein the supporting information comprises a summary of a type of scene media being annotated in the portion of the received immersive media stream, and wherein the summary is ascertainable without the interpretation process to access and interpret the set of metadata and the portion of the received immersive media stream.

7. A non-transitory computer-readable medium storing instructions for processing annotations in an immersive media stream, the instructions comprising:

one or more instructions that, when executed by one or more processors of a device, cause the one or more processors to:

determine, by a first processor, whether a set of metadata associated with a portion of received immersive media stream is coherent with the portion of the received immersive media stream based on predefined criteria; and annotate, by the first processor, the portion of the received immersive media stream to facilitate subsequent access and interpretation of the set of metadata by a second processor that is different from the first processor, wherein the annotating enables the subsequent access and interpretation of the portion of the received immersive media stream without an interpretation process.

8. The non-transitory computer-readable medium of claim 7, one or more instructions further causing the one or more processors to:

identify, by the first processor or the second processor, a version of the set of metadata.

9. The non-transitory computer-readable medium of claim 7, one or more instructions further causing the one or more processors to:

identify, by the first processor or the second processor, a file byte offset indicating a location where the set of metadata has been stored in a file associated with the received immersive media stream.

10. The non-transitory computer-readable medium of claim 7, wherein the set of metadata comprises metadata parameters specified in International Organization for Standardization/International Electrotechnical Commission (ISO/IEC) 28090 Part 28, including a plurality of Independent Mapping Space (IMS) Systems identifiers.

11. The non-transitory computer-readable medium of claim 7, one or more instructions further causing the one or more processors to:

list a plurality of IMS Systems identifiers that are stored within the portion of the received immersive media stream.

12. A device for processing annotations in an immersive media stream, the device comprising:

at least one memory configured to store program code; and at least one processor configured to read the program code and operate as instructed by the program code, the program code comprising:

determining code configured to cause the at least one processor to determine whether a set of metadata associated with a portion of received immersive media stream is coherent with the portion of the received immersive media stream based on predefined criteria; and annotating code configured to cause the at least one processor to annotate the set of metadata while preserving integrity of the set of metadata without replacing the set of metadata partially or entirely, wherein the augmenting comprises adding supporting information in addition to the set of metadata to facilitate subsequent access and interpretation of the set of metadata by a second processor that is different from a first processor.

13. The device of claim 12, the annotating code further comprising:

first identifying code configured to cause the at least one processor to identify characteristics of the set of metadata that are recorded as the supporting information.

14. The device of claim 13, wherein the program code further comprising:

updating code configured to cause the at least one processor to update the set of metadata to facilitate subsequent access and interpretation of the set of metadata by the second processor that is different from the first processor.

15. The device of claim 12, the program code further comprising:

second identifying code configured to cause the at least one processor to identify a largest Independent Mapping Space (IMS) Systems identifier used in annotation of the set of metadata.

16. The device of claim 12, wherein the set of metadata comprises metadata parameters specified in International Organization for Standardization/International Electrotechnical Commission (ISO/IEC) 28090 Part 28.

17. The device of claim 14, wherein the updating code comprises:

first inserting code configured to cause the at least one processor to insert a plurality of IMS sequence identifiers during an annotation process.

18. The device of claim 14, wherein the updating code comprises:

second inserting code configured to cause the at least one processor to insert a plurality of IMS sequence identifiers during an annotation update process.

19. The device of claim 18, wherein the program code further comprises:

providing code configured to cause the at least one processor to provide a file offset location of corresponding asset information for each IMS sequence identifier among the plurality of IMS sequence identifiers.

20. The device of claim 12, wherein the supporting information is of a variable length.

* * * * *